United States Patent
Fan et al.

(10) Patent No.: US 12,328,728 B2
(45) Date of Patent: Jun. 10, 2025

(54) UPLINK TRANSMISSION METHOD, DEVICE, AND STORAGE MEDIUM

(71) Applicant: HUAWEI TECHNOLOGIES CO., LTD., Guangdong (CN)

(72) Inventors: Bo Fan, Chengdu (CN); Xi Zhang, Chengdu (CN); Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 413 days.

(21) Appl. No.: 17/738,613

(22) Filed: May 6, 2022

(65) Prior Publication Data
US 2022/0264561 A1   Aug. 18, 2022

Related U.S. Application Data

(63) Continuation of application No. PCT/CN2019/128090, filed on Dec. 24, 2019.

(30) Foreign Application Priority Data

Nov. 8, 2019  (WO) ................ PCT/CN2019/116745

(51) Int. Cl.
*H04W 72/21*   (2023.01)

(52) U.S. Cl.
CPC .................................. *H04W 72/21* (2023.01)

(58) Field of Classification Search
CPC .. H04B 7/0695; H04B 7/088; H04B 7/06966; H04W 72/21; H04W 72/046
See application file for complete search history.

(56) References Cited

U.S. PATENT DOCUMENTS

| | | | |
|---|---|---|---|
| 11,889,359 B2 * | 1/2024 | Zhang | H04W 36/20 |
| 12,035,404 B2 * | 7/2024 | Cirik | H04B 7/0695 |
| 2014/0198768 A1 | 7/2014 | Hahn et al. | |
| 2019/0190582 A1 | 6/2019 | Guo et al. | |
| 2019/0254110 A1 * | 8/2019 | He | H04W 76/27 |
| 2019/0306924 A1 * | 10/2019 | Zhang | H04B 7/063 |

FOREIGN PATENT DOCUMENTS

| | | |
|---|---|---|
| CN | 106559913 A | 4/2017 |
| CN | 108513737 A | 9/2018 |
| CN | 108811072 A | 11/2018 |
| CN | 109788564 A | 5/2019 |
| CN | 110393025 A | 10/2019 |

(Continued)

OTHER PUBLICATIONS

EP Partial Supplementary European Search Report issued in European Application No. 19951294.8 on Oct. 7, 2022, 14 pages.

(Continued)

*Primary Examiner* — Mahran Y Abu Roumi
(74) *Attorney, Agent, or Firm* — Fish & Richardson P.C.

(57) ABSTRACT

Example uplink transmission methods and apparatus are described. One example method includes determining a spatial relation for uplink transmission of a first cell by a terminal device by using a first resource in a second cell. The terminal device performs uplink transmission in the first cell based on the spatial relation for uplink transmission of the first cell.

19 Claims, 4 Drawing Sheets

(56) References Cited

FOREIGN PATENT DOCUMENTS

| WO | 2016116165 A1 | 7/2016 |
| WO | 2018061293 A1 | 4/2018 |

OTHER PUBLICATIONS

Huawei et al., "Enhancements on Multi-Beam Operation," 3GPP TSG RAN WG1 Meeting #98bis, R1-1910074, Chongqing, China, Oct. 14-20, 2019, 18 pages.

3GPP TS 38.211 V15.5.0 (Mar. 2019), "3rd Generation Partnership Project; Technical Specification Group Radio Access Network; NR; Physical channels and modulation (Release 15)," Mar. 2019, 96 pages.

3GPP TS 38.212 V15.5.0 (Mar. 2019), "3rd Generation Partnership Project; Technical Specification Group Radio Access Network; NR; Multiplexing and channel coding (Release 15)," Mar. 2019, 101 pages.

3GPP TS 38.213 V15.5.0 (Mar. 2019), "3rd Generation Partnership Project; Technical Specification Group Radio Access Network;NR;Physical layer procedures for control (Release 15)," Mar. 2019, 104 pages.

3GPP TS 38.214 V15.5.0 (Mar. 2019), "3rd Generation Partnership Project; Technical Specification Group Radio Access Network; NR; Physical layer procedures for data (Release 15)," Mar. 2019, 103 pages.

3GPP TS 38.331 V15.5.0 (Mar. 2019), "3rd Generation Partnership Project; Technical Specification Group Radio Access Network; NR; Radio Resource Control (RRC) protocol specification (Release 15)," Mar. 2019, 491 pages.

OPPO, "Discussion on Multi-beam Operation Enhancements," 3GPP TSG RAN WG1 #98bis, R1-1910117, Chongqing, China, Oct. 14-20, 2019, 11 pages.

PCT International Search Report and Written Opinion issued in International Application No. PCT/CN2019/116745 on Jul. 27, 2020, 13 pages (with English translation).

PCT International Search Report and Written Opinion issued in International Application No. PCT/CN2019/128090 on Jul. 29, 2020, 20 pages (with English translation).

* cited by examiner

UPLINK TRANSMISSION METHOD, DEVICE, AND STORAGE MEDIUM

CROSS-REFERENCE TO RELATED APPLICATIONS

This application is a continuation of International Application No. PCT/CN2019/128090, filed on Dec. 24, 2019, which claims priority to International Application No. PCT/CN2019/116745, filed on Nov. 8, 2019. The disclosures of the aforementioned applications are hereby incorporated by reference in their entireties.

TECHNICAL FIELD

This application relates to the communication field, and in particular, to an uplink transmission method, a device, and a storage medium.

BACKGROUND

In a 5th generation (5G) mobile communication system, high-frequency communication may be used, that is, data is transmitted by using a super high frequency band (>6 GHz) signal. A main problem of the high-frequency communication is that energy of a signal sharply decreases as a transmission distance increases, resulting in a short transmission distance of the signal. To overcome this problem, an analog beam technology is used in the high-frequency communication, and a large-scale antenna array is used for signal processing, so that the energy of the signal is concentrated in a small range, to form a signal similar to an optical beam (where the signal is referred to as an analog beam, which is referred to as a beam for short), so as to increase a transmission distance.

Both a base station and a terminal device may generate different beams, pointing to different directions. In a current communication system, both a terminal device and a network device support a plurality of beams. However, during data communication, an optimal beam is usually used for communication between the terminal device and the network device. For example, uplink communication is performed between the terminal device using an optimal uplink transmission beam and the network device corresponding to an optimal uplink reception beam and, and downlink communication is performed between the terminal device using an optimal downlink transmission beam and the network device corresponding to an optimal downlink reception beam.

As the terminal device moves, an optimal uplink transmission beam of the terminal device changes. In a conventional technology, when an uplink optimal transmission beam of the terminal device changes, the network device reconfigures an optimal uplink transmission beam for the terminal device by using radio resource control (RRC) reconfiguration signaling. After receiving the RRC reconfiguration signaling, the terminal device updates the optimal uplink transmission beam. When the terminal device moves quickly, the optimal uplink transmission beam of the terminal device changes frequently. This causes frequent sending of the RRC reconfiguration signaling, and signaling overheads are high.

SUMMARY

Embodiments of this application provide an uplink transmission method, a device, and a storage medium, so that a terminal device determines a spatial relation for uplink transmission, and transmits uplink data based on the spatial relation for uplink transmission.

According to a first aspect, an embodiment of this application provides a method for determining a spatial relation for uplink transmission of a terminal device. The method includes: The terminal device determines a spatial relation for uplink transmission of a first cell by using a first resource in a second cell, and the terminal device performs uplink transmission in the first cell based on the spatial relation for uplink transmission of the first cell. In this solution, the spatial relation for uplink transmission that is configured for the terminal device does not need to be obtained by using RRC reconfiguration signaling delivered by a network device. Therefore, sending of the RRC reconfiguration signaling can be reduced, and signaling overheads are relatively low.

In a possible implementation, the second cell includes one of the following: a primary cell corresponding to the first cell, a scheduling cell of the first cell, and a cell in cells that meet a first condition. In this way, a plurality of solutions for selecting the second cell may be provided, so that solution flexibility is improved. In addition, parameters of the primary cell and the scheduling cell of the first cell are relatively similar to a part of parameters of the first cell. Therefore, a reference reliability is relatively high for performing uplink transmission by referring to resources of the primary cell and the scheduling cell of the first cell.

In a possible implementation, the second cell includes one of the following: a primary cell corresponding to the first cell, where a frequency of the primary cell corresponding to the first cell belongs to a frequency range 2; a scheduling cell of the first cell, where a frequency of the scheduling cell of the first cell belongs to the frequency range 2; and a cell in cells that meet a first condition, where the frequency of the primary cell corresponding to the first cell belongs to a frequency range 1, and/or the frequency of the scheduling cell of the first cell belongs to the frequency range 1. In this implementation, an applicable condition is added to various manners of selecting the second cell. In this way, when the second cell is selected, more reasonable selection may be performed based on an objective condition.

In a possible implementation, the cells that meet the first condition include one of the following: a cell in a cell group to which the first cell belongs; in the cell group to which the first cell belongs, a cell that is configured with a control-resource set (CORESET); in the cell group to which the first cell belongs, a cell that uses the frequency range 2; in the cell group to which the first cell belongs, a cell that is configured with the control-resource set and uses the frequency range 2; a cell in a frequency band to which the first cell belongs; in the frequency band to which the first cell belongs, a cell that is configured with a control-resource set; in the frequency band to which the first cell belongs, a cell that uses the frequency range 2; in the frequency band to which the first cell belongs, a cell that is configured with the control-resource set and uses the frequency range 2; a cell in a frequency band list to which the first cell belongs; in the frequency band list to which the first cell belongs, a cell that is configured with a control-resource set; in the frequency band list to which the first cell belongs, a cell that uses the frequency range 2; and in the frequency band list to which the first cell belongs, a cell that is configured with the control-resource set and uses the frequency range 2. A plurality of ranges are provided for selection of the second cell, so that flexibility of selection of the second cell is improved. In addition, when the second cell is selected from a cell group, a frequency band to which the second cell belongs, or a frequency band list to which the second cell belongs, a parameter of the second cell is relatively similar to a part of parameters of the first cell. Therefore, a reference reliability is relatively high for performing uplink transmission by referring to resources of the second cell. In addition to the primary cell and the scheduling cell, an optional range for selection of the second cell is extended, and more optional solutions are provided for determining a transmission beam for uplink transmission.

In a possible implementation, the second cell includes one of the following: in the cells that meet the first condition, a cell with a minimum or maximum index; and in the cells that meet the first condition, a cell whose frequency is the most similar to that of the first cell, where if in the cells that meet the first condition, there are a plurality of cells whose frequencies are the most similar to that of the first cell, the second cell includes the cell with the minimum or maximum index in the cells that meet the first condition and whose frequencies are the most similar to that of the first cell. One second cell may be determined in the several implementations. In addition, a solution for selecting the second cell based on the index is relatively simple and easy to operate, and the second cell selected based on the frequency is the most similar to the first cell. Therefore, a reference reliability is the highest.

In a possible implementation, the first resource in the second cell includes one of the following: in a bandwidth part (BWP) currently activated in the second cell, a reference signal resource that is used to indicate quasi-co-location (QCL) information of a physical downlink control channel (PDCCH) and that is in a control-resource set with a minimum or maximum index in one or more control-resource sets that are obtained by the terminal device through monitoring last time; in the bandwidth part currently activated in the second cell, a reference signal resource in a transmission configuration indication state (TCI-state) with a minimum or maximum index in TCI-states that are used for transmission of a physical downlink shared channel (PDSCH); when the terminal device performs an initial access process in the second cell, a resource in a synchronization signal and physical broadcast channel block (synchronization signal and PBCH block, SSB) used by the terminal device; a resource in a spatial relation for uplink transmission of the second cell; and a reference signal resource for road loss measurement of the second cell. A plurality of solutions for determining the first resource may be provided, so that solution flexibility is improved.

In a possible implementation, the uplink transmission includes one of the following: uplink transmission of a physical uplink control channel (PUCCH); uplink transmission of a physical uplink shared channel (PUSCH); and uplink transmission of a sounding reference signal (SRS). In this way, an application scope of embodiments of this application may be extended.

In a possible implementation, a spatial domain reception filter of the first resource includes a spatial domain transmission filter for the uplink transmission. In other words, a transmission beam is determined based on a reception beam corresponding to the first resource, so that delivery of RRC signaling used to configure the transmission beam is reduced.

In a possible implementation, that the terminal device determines a spatial relation for uplink transmission of a first cell by using a first resource in a second cell includes one of the following: When the spatial relation for uplink transmission is not configured in the first cell, the terminal device determines the spatial relation for uplink transmission of the first cell by using the first resource in the second cell. When the spatial relation for uplink transmission is not configured in the first cell, no CORESET is configured in the first cell, and no TCI-state that is used for transmission of the PDSCH is activated in a downlink bandwidth part currently activated in the first cell, the terminal device determines the spatial relation for uplink transmission of the first cell by using the first resource in the second cell. When the spatial relation for uplink transmission and a reference signal resource for road loss measurement are not configured in the first cell, no CORESET is configured in the first cell, and no TCI-state that is used for transmission of the PDSCH is activated in the first cell, the terminal device determines the spatial relation for uplink transmission of the first cell by using the first resource in the second cell. This solution provides several execution conditions for performing uplink transmission by using the first resource of the second cell, so that another solution may be selected under some conditions to determine the spatial relation for uplink transmission. However, when the spatial relation for uplink transmission is determined based on the first resource of the second cell under the foregoing several conditions, practicability of the solution is improved.

According to a second aspect, an embodiment of this application provides a method for determining a spatial relation for uplink transmission of a terminal device. The method includes: When a network device updates a spatial relation used to enable a terminal device to perform uplink transmission in a first cell, and a third condition is met, the network device delivers, to the terminal device, the spatial relation used to enable the terminal device to perform uplink transmission in the first cell. In this solution, it is not necessary to deliver the spatial relation for uplink transmission each time when the spatial relation for uplink transmission is updated, so that signaling used to indicate the spatial relation for uplink transmission can be reduced, thereby reducing signaling overheads.

In a possible implementation, the third condition may include one or more of the following: The first cell is a secondary cell, a frequency of a primary cell corresponding to the first cell belongs to an FR1, no CORESET is configured in the first cell, and no TCI-state that is used for transmission of a PDSCH is activated in the first cell; no CORESET is configured in the first cell, and no TCI-state that is used for an active state of the PDSCH is configured in the first cell; and the terminal device does not have uplink-downlink beam reciprocity. This can improve solution flexibility.

According to a third aspect, an embodiment of this application provides a method for determining a spatial relation for uplink transmission of a terminal device. In the method, uplink transmission is performed in a first cell by using a transmission beam for the uplink transmission that is configured by a network device as a transmission beam for the uplink transmission when a plurality of control-resource set groups are configured. Alternatively, uplink transmission is performed in a first cell by using a first beam as a transmission beam for the uplink transmission when a plurality of control-resource set groups are configured. Each of the plurality of control-resource set groups includes one or more control-resource sets, control-resource sets included in one control-resource set group have a same first index value, and control-resource sets from two different control-resource set groups have different first index values. The first beam includes one of the following: a reception beam of a PDCCH for scheduling the uplink transmission; a reception beam of a PDCCH corresponding to a control-resource set with a minimum or maximum index in a control-resource set group to which the PDCCH for scheduling the uplink transmission belongs; a reception beam of a PDCCH corresponding to a control-resource set with a minimum or maximum index in a control-resource set group associated with the uplink transmission; and a reception beam of a reference signal resource for road loss measurement for the uplink transmission. In this solution, the spatial relation for uplink transmission that is configured for the terminal device does not need to be obtained by using RRC reconfiguration signaling delivered by the network device. Therefore, sending of the RRC reconfiguration signaling can be reduced, and signaling overheads are relatively low.

In a possible implementation, that uplink transmission is performed in a first cell by using a transmission beam for the uplink transmission that is configured by a network device as a transmission beam for the uplink transmission when a plurality of control-resource set groups are configured includes: When the plurality of control-resource set groups are configured, if the network device configures the transmission beam for the uplink transmission, the uplink transmission is performed in the first cell by using the transmission beam for the uplink transmission that is configured by the network device as the transmission beam for the uplink transmission. In this implementation, in a possible implementation, it may be specified that when the plurality of control-resource set groups are configured, the network device needs to configure the transmission beam for the uplink transmission. In other words, when the plurality of control-resource set groups are configured, the terminal device can perform uplink transmission only by using the transmission beam configured by the network device, and cannot use another beam (for example, the first beam) as the transmission beam for the uplink transmission. In this way, when the plurality of control-resource set groups are configured, the uplink transmission may be performed by using the transmission beam configured by the network device.

In a possible implementation, that uplink transmission is performed in a first cell by using a first beam as a transmission beam for the uplink transmission when a plurality of control-resource set groups are configured includes: When the plurality of control-resource set groups are configured, the uplink transmission is performed in the first cell by using the first beam as the transmission beam for the uplink transmission if one or more of the following conditions are met: The network device does not configure the transmission beam for the uplink transmission for the terminal device; the network device does not configure the reference signal resource for road loss measurement for the uplink transmission for the terminal device; the network device indicates that the terminal device may use another transmission beam or another reception beam as the transmission beam for the uplink transmission; and the terminal device has a beam correspondence. In this way, under these conditions, the uplink transmission may be performed in the first cell by using the first beam as the transmission beam for the uplink transmission, so that the spatial relation for uplink transmission that is configured for the terminal device does not need to be obtained by using RRC reconfiguration signaling delivered by the network device. Therefore, sending of the RRC reconfiguration signaling can be reduced, and signaling overheads are relatively low.

In a possible implementation, the control-resource set group associated with the uplink transmission includes one of the following: a control-resource set group to which a control-resource set associated with the uplink transmission belongs; and a second index value corresponding to the uplink transmission, where a first index value of the control-resource set group associated with the uplink transmission is the same as the second index value corresponding to the uplink transmission.

According to a fourth aspect, an embodiment of this application provides an uplink transmission method. The method is applicable to a scenario in which one or more control-resource set groups are configured for a terminal device. In the method, a reference signal resource for road loss measurement for uplink transmission that is configured by a network device is used as a reference signal resource for road loss measurement for the uplink transmission, and road loss measurement is performed; or a third resource is used as a reference signal resource for road loss measurement for the uplink transmission, and road loss measurement is performed. The third resource includes one of the following: a QCL reference signal resource of a typeD type in a TCI-state of a PDCCH for scheduling the uplink transmission; a QCL reference signal resource of a typeD type in a TCI-state of a control-resource set with a minimum or maximum index in a control-resource set group to which a PDCCH for scheduling the uplink transmission belongs; a QCL reference signal resource of a typeD type in a TCI-state of a PDCCH corresponding to a control-resource set with a minimum or maximum index in a control-resource set group associated with the uplink transmission; a reference signal resource in a spatial relation for the uplink transmission; and a reference signal resource for road loss measurement in a set of reference signal resources for road loss measurement corresponding to the uplink transmission. In this way, the reference signal resource for road loss measurement for the uplink transmission can be determined in a plurality of manners, so that solution flexibility is improved.

In a possible implementation, that a reference signal resource for road loss measurement for uplink transmission that is configured by a network device is used as a reference signal resource for road loss measurement for the uplink transmission includes: When a plurality of control-resource set groups are configured, and the network device configures the reference signal resource for road loss measurement for the uplink transmission, the reference signal resource for road loss measurement for the uplink transmission that is configured by the network device is used as the reference signal resource for road loss measurement for the uplink transmission. In this implementation, in a possible implementation, it may be specified that when the plurality of control-resource set groups are configured, the network device needs to configure the reference signal resource for road loss measurement for the uplink transmission. In this way, when the plurality of control-resource set groups are configured, the uplink transmission may be performed by using the reference signal resource for road loss measurement that is configured by the network device.

In a possible implementation, that a third resource is used as a reference signal resource for road loss measurement for the uplink transmission includes: When a plurality of control-resource set groups are configured, the third resource is used as the reference signal resource for road loss measurement for the uplink transmission when one or more of the following conditions are met: The network device does not configure a transmission beam for the uplink transmission; the network device does not configure the reference signal resource for road loss measurement for the uplink transmission; the network device indicates that a terminal device may use another transmission beam or another reception beam as the transmission beam for the uplink transmission;

and the terminal device has a beam correspondence. In this way, under these conditions, the uplink transmission may be performed in the first cell by using the third resource as the reference signal resource for road loss measurement for the uplink transmission, so that the reference signal resource for road loss measurement for the uplink transmission that is configured for the terminal device does not need to be obtained by using RRC reconfiguration signaling delivered by the network device. Therefore, sending of the RRC reconfiguration signaling can be reduced, and signaling overheads are relatively low.

In a possible implementation, the set of reference signal resources for road loss measurement corresponding to the uplink transmission includes one of the following: a set of configured reference signal resources for road loss measurement; reference signal resources of K control-resource sets with minimum or maximum indexes in configured control-resource sets; reference signal resources of K control-resource sets with minimum or maximum indexes in the configured control-resource set group associated with the uplink transmission; in a currently activated bandwidth part, reference signal resources corresponding to K TCI-states in TCI-states that are used for transmission of a physical downlink shared channel; and in the currently activated bandwidth part, reference signal resources corresponding to K TCI-states with minimum or maximum indexes in the TCI-states that are used for transmission of the physical downlink shared channel. In this way, more solution options may be provided, to improve solution flexibility.

In a possible implementation, the control-resource set group associated with the uplink transmission includes one of the following: a control-resource set group to which a control-resource set associated with the uplink transmission belongs; and a second index value corresponding to the uplink transmission, where a first index value of the control-resource set group associated with the uplink transmission is the same as the second index value corresponding to the uplink transmission.

According to a fifth aspect, an embodiment of this application provides a method for determining a spatial relation for uplink transmission of a terminal device. In the method, when a plurality of control-resource set groups are configured for the terminal device, a network device needs to configure a transmission beam for the uplink transmission of the terminal device; and/or when a plurality of control-resource set groups are configured for the terminal device, the network device needs to configure a reference signal resource for road loss measurement for the uplink transmission of the terminal device. Each of the plurality of control-resource set groups includes one or more control-resource sets, control-resource sets included in one control-resource set group have a same first index value, and control-resource sets from two different control-resource set groups have different first index values. In this way, a restriction condition may be added to the network device to configure the transmission beam and/or the reference signal resource for road loss measurement. Therefore, the configured transmission beam and/or the reference signal resource for road loss measurement can be delivered only when the restriction condition is met, so that sending of RRC reconfiguration signaling can be reduced, and signaling overheads are relatively low.

Corresponding to any method for determining the spatial relation for uplink transmission of the terminal device according to the first aspect to the fifth aspect, this application further provides a communication device. The communication device may be any transmit end device or any receive end device that performs data transmission in a wireless manner, for example, a communication chip, a terminal device, or a network device (for example, a base station). In a communication process, a transmit end device is relative to a receive end device. In some communication processes, the communication device may be used as the foregoing network device or a communication chip that may be used in the network device. In some communication processes, the communication device may be used as the foregoing terminal device or a communication chip that may be used in the terminal device.

According to a sixth aspect, a communication device is provided. The communication device includes a transceiver unit and a processing unit, to perform any implementation of any communication method according to the first aspect to the fifth aspect. The transceiver unit is configured to perform functions related to sending and receiving. Optionally, the transceiver unit includes a receiving unit and a sending unit. In a design, the communication device is a communication chip, and the transceiver unit may be an input/output circuit or a port of the communication chip.

In another design, the transceiver unit may be a transmitter and a receiver, or the transceiver unit may be a transmitter and a receiver.

Optionally, the communication device further includes modules that may be configured to perform any implementation of any communication method according to the first aspect to the fifth aspect.

According to a seventh aspect, a communication device is provided. The communication device is the terminal device or the network device. The communication device includes a processor and a memory. The memory is configured to store program code. The processor is configured to invoke the program code from the memory, to perform the method according to the first aspect or the fifth aspect.

According to an eighth aspect, an embodiment of this application provides a communication device. The communication device includes a processor, a memory, and a transceiver. The transceiver is configured to receive a signal or send a signal. The memory is configured to store program code. The processor is configured to invoke the program code from the memory, to perform the method according to the first aspect or the fifth aspect. The memory is configured to store a computer program or instructions. The processor is configured to invoke the computer program or the instructions from the memory and run the computer program or the instructions. When the processor executes the computer program or instructions in the memory, the communication device is enabled to perform any implementation of any communication method according to the first aspect to the fifth aspect.

Optionally, there are one or more processors, and there are one or more memories.

Optionally, the memory may be integrated with the processor, or the memory and the processor are disposed separately.

Optionally, the transceiver may include a transmitter and a receiver.

According to a ninth aspect, a communication device is provided. The communication device includes a processor. Optionally, the processor is coupled to a memory, and may be configured to perform the method according to any one of the first aspect to the fifth aspect and the possible implementations of the first aspect to the fifth aspect. Optionally, the communication device further includes the memory. Optionally, the communication device further includes a communication interface, and the processor is coupled to the communication interface.

In an implementation, the communication device is a terminal device. When the communication device is the terminal device, the communication interface may be a transceiver or an input/output interface. Optionally, the transceiver may be a transceiver circuit. Optionally, the input/output interface may be an input/output circuit.

In another implementation, the communication device is a network device. When the communication device is the network device, the communication interface may be a transceiver or an input/output interface. Optionally, the transceiver may be a transceiver circuit. Optionally, the input/output interface may be an input/output circuit.

In still another implementation, the communication device is a chip or a chip system. When the communication device is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a tenth aspect, an embodiment of this application provides a communication device. The communication device includes a processor and an interface circuit. The interface circuit is configured to receive code instructions and transmit the code instructions to the processor. The processor runs the code instructions to perform the corresponding method according to the first aspect or the fifth aspect.

According to an eleventh aspect, a system is provided. The system includes the foregoing terminal device and network device.

According to a twelfth aspect, a computer program product is provided. The computer program product includes a computer program (which may also be referred to as code or instructions). When the computer program is run, a computer is enabled to perform the method according to any possible implementation of the first aspect, or the computer is enabled to perform the method according to any implementation of the first aspect to the fifth aspect.

According to a thirteenth aspect, a computer-readable storage medium is provided. The computer-readable storage medium stores a computer program (which may also be referred to as code or instructions). When the computer program is run on a computer, the computer is enabled to perform the method according to any possible implementation of the first aspect, or the computer is enabled to perform the method according to any implementation of the first aspect to the fifth aspect.

According to a fourteenth aspect, a communication device is provided. The communication device includes an input circuit, an output circuit, and a processing circuit. The processing circuit is configured to receive a signal through the input circuit, and transmit a signal through the output circuit, so that the method according to any one of the first aspect to the fifth aspect, and any one of the possible implementations of the first aspect to the fifth aspect is implemented.

In a specific implementation process, the processing device may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

DESCRIPTION OF EMBODIMENTS

A person of ordinary skill in the art may be aware that, various illustrative logical blocks and steps that are described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Figure 1:
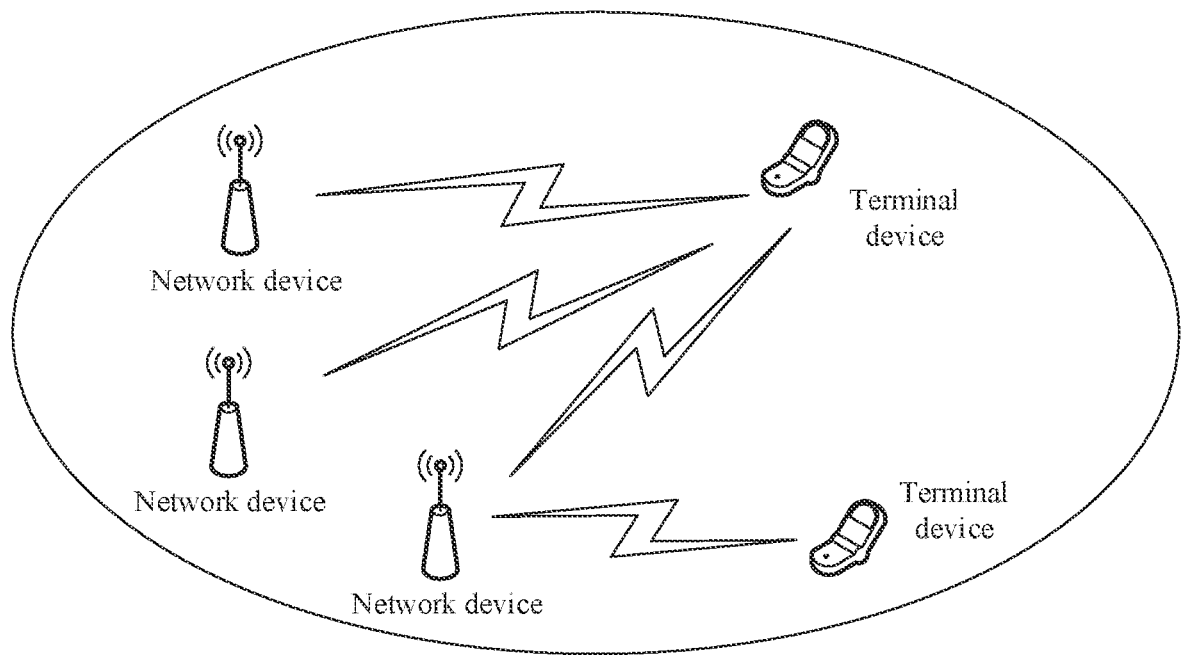
FIG. 1 is a schematic diagram of a possible system architecture to which an embodiment of this application is applicable.

FIG. 1 is a schematic diagram of a possible system architecture to which an embodiment of this application is applicable. The system architecture shown in FIG. 1 includes a network device and a terminal device. A single network device may transmit data or control signaling to a single terminal device or a plurality of terminal devices. A plurality of network devices may also transmit data or control signaling to a single terminal device. It should be understood that, a quantity of network devices and a quantity of terminal devices in the system architecture are not limited in embodiments of this application. Moreover, in addition to the network device and the terminal device, the system architecture to which embodiments of this application are applicable may further include other devices such as a core network device, a wireless relay device, and a wireless backhaul device. This is not limited in embodiments of this application either. In addition, the network device in embodiments of this application may integrate all functions into one independent physical device, or may distribute the functions on a plurality of independent physical devices. This is not limited in embodiments of this application either. In addition, the terminal device in embodiments of this application may be connected to the network device in a wireless manner.

The technical solutions in embodiments of this application may be applied to various communication systems, for example, a global system for mobile communications (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a 5G communication system.

In the system architecture shown in FIG. 1, transmission performed by the terminal device in a direction of the network device may be referred to as uplink transmission. Transmission performed by the network device in a direction of the terminal device may be referred to as downlink transmission. The uplink transmission may include transmission of a physical uplink control channel (PUCCH), a PUSCH, an SRS, and the like.

In embodiments of this application, the uplink transmission may be performed by using a single beam, or may be performed by using a plurality of beams. For example, in multi-beam or multi-station-based downlink transmission, the network device transmits downlink data to the terminal device by using a plurality of beams, and the terminal device receives the downlink data by using a plurality of reception beams. Conversely, the terminal device also sends uplink data to the network device by using a plurality of transmission beams, and the network device correspondingly receives, by using a plurality of beams, the uplink data transmitted by the terminal device.

The following describes terms and related technologies in embodiments of this application.

(1) Terminal Device

The terminal device may include various handheld devices, vehicle-mounted devices, wearable devices, or computing devices that have a wireless communication function, or other processing devices connected to a wireless modem. The terminal may be a mobile station (MS), a subscriber unit, a cellular phone, a smart phone, a wireless data card, a personal digital assistant (PDA) computer, a tablet computer, a wireless modem, a handheld device (handset), a laptop computer, a machine type communication (MTC) terminal, or the like.

(2) Network Device

The network device may be a device deployed in a radio access network to provide a wireless communication function for the terminal device. The network device may include a macro base station, a micro base station (also referred to as a small cell), a relay station, an access point, and the like in various forms. In systems using different radio access technologies, names of the network device may be different, for example, may be a base transceiver station (BTS) in a GSM or CDMA network, a NodeB (NB) in WCDMA, or an evolved NodeB (eNB or eNodeB) in LTE. The network device may alternatively be a radio controller in a cloud radio access network (CRAN) scenario. The network device may alternatively be a base station device in a future 5G network or a network device in a future evolved public land mobile network (PLMN) network. The network device may alternatively be a wearable device or a vehicle-mounted device. The network device may alternatively be a transmission reception point (TRP). This is not limited in embodiments of this application.

(3) Beam

The beam in a new radio (NR) protocol may be represented by a spatial domain filter, or may be referred to as a spatial filter, a spatial domain parameter, a spatial parameter, a spatial domain setting, a spatial setting, QCL information, a QCL assumption, a QCL indication, or the like. The beam may be indicated by using a TCI-state parameter or a spatial relation parameter. Therefore, in this application, the beam may be replaced with a spatial domain filter, a spatial filter, a spatial domain parameter, a spatial parameter, a spatial domain setting, a spatial setting, QCL information, a QCL assumption, a QCL indication, a TCI-state (a downlink (DL) TCI-state or an uplink (UL) TCI-state), a spatial relation, or the like. The terms described above are also equivalent to each other. Alternatively, the beam may be replaced with another term representing the beam. This is not limited in this application.

A beam used to send a signal may be referred to as a transmission beam (Tx beam), or may be referred to as a spatial domain transmission filter, a spatial transmission filter, a spatial domain transmission parameter, a spatial transmission parameter, a spatial domain transmission setting, or a spatial transmission setting. A downlink transmission beam may be indicated by using a TCI-state.

A beam used to receive a signal may be referred to as a reception beam (Rx beam), or may be referred to as a spatial domain reception filter, a spatial reception filter, a spatial domain reception parameter, a spatial reception parameter, a spatial domain reception setting, or a spatial reception setting. An uplink transmission beam may be indicated by using a spatial relation, an uplink TCI-state, or an SRS resource (which indicates that a transmission beam of an SRS is used). Therefore, the uplink transmission beam may alternatively be replaced with an SRS resource.

The downlink transmission beam may be indicated by using a TCI-state, where a TCI-state may be written as a TCI-state in this application. The uplink transmission beam may be indicated by using a spatial relation. Therefore, determining the uplink transmission beam may be equivalent to determining the spatial relation for uplink transmission.

For ease of description, in embodiments of this application, a spatial relation is mainly used as an example for description. In some places, a spatial domain filter is also used as an example for description. A beam used to send a signal is described by using a spatial domain transmission filter or a transmission beam as an example. A beam used to receive a signal is described by using a spatial domain reception filter or a reception beam as an example. In embodiments of this application, the beam may be replaced with a term that can represent the beam, for example, a resource, a TCI-state, a spatial relation, a spatial parameter, or a spatial filter.

The transmission beam may refer to distribution of signal strength formed in different directions in space after a signal is transmitted through an antenna, and the reception beam may refer to distribution of signal strength, in different directions in space, of a radio signal received from an antenna.

The beam may be a wide beam, a narrow beam, or another type of beam. A technology for forming the beam may be a beamforming technology or another technology. The beamforming technology may be specifically a digital beamforming technology, an analog beamforming technology, a hybrid digital/analog beamforming technology, or the like The beam generally corresponds to a resource. For example, when beam measurement is performed, the network device measures different beams by using different resources, the terminal device feeds back resource quality obtained through measurement, and the network device may determine quality of a corresponding beam based on the resource quality fed back by the terminal device. For data transmission, information about the beam may be indicated by using a resource corresponding to the beam. For example, the network device may indicate information about a PDSCH beam of the terminal device by using a TCI field in downlink control information (DCI).

Optionally, a plurality of beams that have a same communication feature or similar communication features are considered as one beam. One beam may include one or more antenna ports, configured to transmit a data channel, a control channel, a sounding signal, and the like. The one or more antenna ports forming the beam may also be considered as one antenna port set.

In embodiments of this application, during beam measurement, each beam of the network device may correspond to one resource. Therefore, the beam corresponding to the resource may be identified by using an index of the resource.

(4) Spatial Relation

An uplink transmission beam is indicated by using a spatial relation in the 3GPP R15 protocol. In embodiments of this application, a beam is indicated by using a spatial relation as an example for description, and the spatial relation in English is spatial relation.

The spatial relation may include an index of an SRS resource, indicating that uplink transmission is performed by using a transmission beam of the SRS resource. For example, a spatial relation used by one PUCCH includes an SRS resource #1, indicating that a transmission beam of the PUCCH is the same as the SRS resource #1. In this way, the terminal device sends the PUCCH by using a transmission beam of the SRS resource #1.

The spatial relation may also include a downlink reference signal resource, for example, an SSB or a channel state information reference signal (CSI-RS), indicating that uplink transmission is performed by using a reception beam of the downlink reference signal resource. For example, a spatial relation used by one PUCCH includes a CSI-RS resource #1, indicating that a transmission beam of the PUCCH is the same as a reception beam of the CSI-RS resource #1. In this way, the terminal device sends the PUCCH by using the reception beam of the CSI-RS resource #1.

(5) Resource

During beam measurement, a beam corresponding to the resource may be identified by using an index of the resource. The resource may be an uplink signal resource, or may be a downlink signal resource. An uplink signal includes but is not limited to an SRS and a demodulation reference signal (DMRS). A downlink signal includes but is not limited to a CSI-RS, a cell-specific reference signal (CS-RS), a UE-specific reference signal (US-RS), a DMRS, and a synchronization signal/physical broadcast channel block (SS/PBCH block). The SS/PBCH block may be referred to as an SSB for short.

The resource is configured by using RRC signaling. In a configuration structure, one resource is one data structure, including a related parameter of an uplink/downlink signal corresponding to the resource, for example, a type of the uplink/downlink signal, a resource element that carries the uplink/downlink signal, transmit time and a transmit periodicity of the uplink/downlink signal, and a quantity of ports used to send the uplink/downlink signal. A resource of each uplink/downlink signal has an index to identify the resource of the uplink/downlink signal. It may be understood that the index of the resource may also be referred to as an identifier of the resource. This is not limited in embodiments of this application.

(6) CORESET

One CORESET includes a plurality of physical resource blocks (PRBs) in frequency domain, and includes one or several consecutive symbols in time domain, and the symbols may be located at any position in a slot. Transmission of a PDCCH is performed in the CORESET. In embodiments of this application, a control-resource set may be written as a CORESET.

(7) Cell

The cell in embodiments of this application may be, for example, a cell covered by a base station. The cell is an area that provides a wireless communication service for a user, and is a fundamental unit of a wireless network. For example, in NR, an NR cell resource is added by running Man-Machine Language (MML) commands, ADD NRCELL and ADD NRDUCELL. A network side device may configure a plurality of cells for a terminal side device, where there is one cell in which initial access is initiated, the cell is referred to as a primary cell, and other cells become secondary cells. All cells are covered by the entire wireless network.

It should be understood that, in the method of this application, the cell may alternatively be replaced with a carrier, a carrier component (CC), a frequency band, a BWP, and the like.

(8) Quasi-Co-Located (QCL) Attribute

In an NR protocol, QCL is defined as: if a large-scale characteristic of a channel of a symbol transmitted on one antenna port may be derived from a channel of a symbol transmitted on another antenna port, the two antenna ports are quasi-co-located. It may be described as that the two antenna ports have a quasi-co-located attribute, or may be described as that the two antenna ports have a quasi-co-located relation.

A QCL relation is used to indicate that a plurality of resources have one or more same or similar communication features. For a plurality of resources having a QCL relation, a same or similar communication configuration may be used. For example, two signals are transmitted from two different antenna ports and experience a same large-scale property. In this case, it may be considered that the two antenna ports have a QCL relation. Therefore, a channel large-scale property/channel estimation result of transmitting one symbol by one port may be derived from a channel large-scale property of transmitting one symbol by another port. This is beneficial for processing by a receiver. The large-scale characteristic includes one or more delay spreads, one or more Doppler spreads, one or more Doppler shifts, one or more average gains, one or more average delays, and one or more spatial reception parameters (spatial Rx parameters). The QCL may include four types: QCL-typeA, QCL-typeB, QCL-typeC, and QCL-typeD.

A parameter of the QCL-typeA is: {Doppler shift, Doppler spread, average delay, delay spread}. A parameter of the QCL-typeB is: {Doppler shift, Doppler spread}. A parameter of the QCL-typeC is: {Doppler shift, average delay}. A parameter of the QCL-typeD is: {Spatial Rx parameter}.

A QCL-typeD relation may be described as "for the purpose of determining the CORESET, a Synchronization/PBCH block is considered to have different QCL-typeD properties than a CSI-RS". Correspondingly, this is translated as follows: To determine a CORESET for monitoring a PDCCH, it may be understood that an SS/PBCH and a CSI-RS have different QCL-typeD properties. It may be understood that one synchronization/physical broadcast channel block corresponds to one wide beam, and one channel state information reference signal corresponds to one narrow beam. Although the narrow beam may be obtained from the wide beam through beam refinement, it is still considered that the wide beam and the narrow beam are two different beams. Beam information of the two beams is different, that is, QCL-typeD properties are different. The QCL-typeD is used to assist in beamforming, for example, used to form a spatial filter or a beam indication. The QCL-typeD can be understood from perspectives of a transmit end and a receive end. From the perspective of the transmit end, if two antenna ports are of QCL-typeD, it means that beam directions corresponding to the two antenna ports are spatially consistent. From the perspective of the receive end, if two antenna ports are of QCL-typeD, it means that the receive end can receive, in a same beam direction, signals sent from the two antenna ports.

(9) Bandwidth Part

In embodiments of this application, the bandwidth part may be written as a BWP for short.

(10) Other

Terms "system" and "network" may be used interchangeably in embodiments of this application. "At least one" means one or more, and "a plurality of" means two or more. "And/or" describes an association relationship between associated objects and indicates that three relationships may exist. For example, A and/or B may indicate the following cases: Only A exists, both A and B exist, and only B exists. A and B may be singular or plural. A character "/" generally indicates an "or" relationship between associated objects. "At least one of the following items (pieces)" or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, and not used to limit an order, a time sequence, priorities, or importance of the plurality of objects. For example, a first PDCCH monitoring occasion (MO) and a second PDCCH MO are merely used to distinguish different PDCCH MOs, but do not indicate different priorities, importance, or the like of the two PDCCH MOs.

Figure 2:
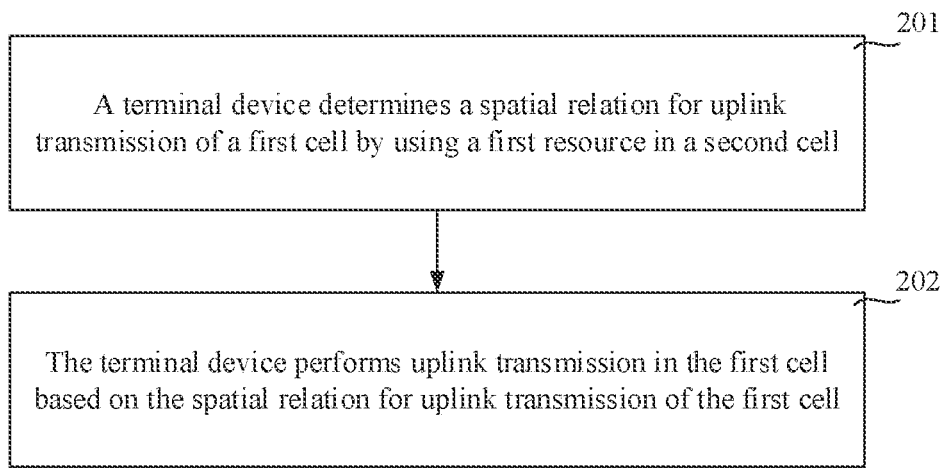
FIG. 2 is a schematic flowchart of a method for determining a spatial relation for uplink transmission of a terminal device according to an embodiment of this application.

Based on the foregoing content, FIG. 2 shows an example of a schematic flowchart of a method for determining a spatial relation for uplink transmission of a terminal device. As shown in FIG. 2, the method includes the following steps.

Step 201: The terminal device determines a spatial relation for uplink transmission of a first cell by using a first resource in a second cell.

In step 201, the first cell and the second cell are two cells configured by a network device for the terminal device. A frequency of the first cell is a high frequency, and a frequency of the second cell is a high frequency. In other words, the terminal device may perform high-frequency communication in the first cell, that is, may transmit data in the first cell by using a signal of an ultra-high frequency band. The terminal device may perform high-frequency communication in the second cell, that is, may transmit data in the second cell by using a signal of an ultra-high frequency band (for example, a frequency band greater than 6 GHz).

Step 202: The terminal device performs uplink transmission in the first cell based on the spatial relation for uplink transmission of the first cell.

In step 202, the terminal device may use a reception beam corresponding to the first resource as a transmission beam. Alternatively, it may be described as that the terminal device uses a spatial domain reception filter of the first resource as a spatial domain transmission filter for performing uplink transmission in the first cell.

In this embodiment of this application, the terminal device may determine the spatial relation for uplink transmission of the first cell by using the first resource in the second cell. In this solution, the spatial relation for uplink transmission that is configured for the terminal device does not need to be obtained by using RRC reconfiguration signaling delivered by the network device. Therefore, sending of the RRC reconfiguration signaling can be reduced, and signaling overheads are relatively low. In addition, multi-beam uplink data transmission may be implemented by using the solution provided in this embodiment of this application. For example, codebook-based multi-beam data transmission and non-codebook-based multi-beam data transmission may be implemented.

On the other hand, when the RRC reconfiguration signaling is used to configure the spatial relation for uplink transmission for the terminal device, after receiving the RRC reconfiguration signaling, the terminal device needs to parse the signaling to obtain the spatial relation for uplink transmission that is carried in the signaling. In addition to bringing signaling overheads, this process takes long time, and consequently the spatial relation for uplink transmission takes effect slowly. In the solution provided in this embodiment of this application, the terminal device determines the spatial relation for uplink transmission of the first cell by using the first resource in the second cell. Compared with a process in which signaling needs to be received and parsed, this process saves time, and the spatial relation for uplink transmission takes effect quickly.

In step 201, there may be a plurality of solutions for selecting the second cell. For example, the second cell may be a cell whose frequency is relatively similar to that of the first cell in a plurality of cells configured by the network device for the terminal device. For another example, the second cell may be a cell whose frequency is the most similar to that of the first cell in a plurality of cells configured by the network device for the terminal device. The following describes several solutions for determining the second cell by using a solution a1, a solution a2, a solution a3, a solution b1, a solution b2, a solution b3, a solution b4, and a solution b5.

In the solution a1, the second cell may be a primary cell corresponding to the first cell.

In the solution a1, the second cell may be a primary cell (Pcell) of a master cell group (MCG) corresponding to the first cell, a primary cell PScell of a secondary cell group (SCG) corresponding to the first cell, a PUCCH-Scell of an MCG corresponding to the first cell, or a PUCCH-Scell of an SCG corresponding to the first cell. The Pcell or the PScell may be preferentially used in the foregoing cells, and if a frequency of the Pcell or the PScell belongs to an FR1, the PUCCH-Scell may be used. For example, if the current first cell is a cell in the MCG, the Pcell is preferentially used, or if the frequency of the Pcell belongs to the FR1, the PUCCH-Scell in the MCG is used. For another example, if the current first cell is a cell in the SCG, the PScell is preferentially used; or if the frequency of the PScell belongs to the FR1, the PUCCH-Scell in the SCG is used. The PUCCH-Scell is a secondary cell (Scell) configured with a PUCCH.

The solution a1 may further include an implementation condition, and the condition is that the first cell is an Scell. In an optional implementation, when the first cell is the secondary cell, the primary cell corresponding to the first cell may be selected as the second cell. Certainly, in another implementation, when the first cell is the secondary cell, a cell other than the primary cell corresponding to the first cell may be selected as the second cell.

For the solution a1, another applicable condition may also be added. For example, the second cell may be the primary cell corresponding to the first cell, and a TCI-state of the primary cell corresponding to the first cell includes QCL-info of a typeD type. In this solution, in an optional implementation, when the TCI-state of the primary cell corresponding to the first cell includes the QCL-info of the typeD type, and the first cell is the secondary cell, the primary cell corresponding to the first cell may be selected as the second cell. Certainly, in another implementation, when the TCI-state of the primary cell corresponding to the first cell includes the QCL-info of the typeD type, and the first cell is the secondary cell, a cell other than the primary cell corresponding to the second cell may also be selected as the second cell.

For another example, an applicable condition added to the solution a1 is that the second cell is the primary cell corresponding to the first cell, and a frequency of the second cell is an FR2. In this solution, in an optional implementation, when the frequency of the primary cell corresponding to the first cell belongs to the FR2, and the first cell is the secondary cell, the primary cell corresponding to the first cell may be selected as the second cell. Certainly, in another implementation, when the frequency of the primary cell corresponding to the first cell belongs to the FR2, and the first cell is the secondary cell, a cell other than the primary cell corresponding to the second cell may also be selected as the second cell.

In this embodiment of this application, the primary cell corresponding to the first cell may be a Pcell, referred to as a primary cell in full English, or the primary cell corresponding to the first cell may be a PScell, referred to as a primary secondary cell in full English. Optionally, if the first cell is configured in an MCG, the primary cell may be a Pcell; or if the first cell is configured in an SCG, the primary cell may be a PScell.

In the solution a2, the second cell may be a scheduling cell of the first cell.

The scheduling cell of the first cell in this embodiment of this application may be written as a scheduling cell in English. The scheduling cell may mean that scheduling information of uplink transmission or downlink transmission of the second cell is sent by using DCI of the first cell. In other words, the network device sends downlink control information to the terminal device by using the second cell, where the downlink control information is used to schedule uplink transmission or downlink transmission of the first cell.

For the solution a2, another applicable condition may also be added. For example, the second cell is the scheduling cell of the first cell, and the frequency of the second cell belongs to the FR2. In this solution, in an optional implementation, when the frequency of the scheduling cell of the first cell belongs to the FR2 and the first cell is the secondary cell, the scheduling cell of the first cell may be selected as the second cell. Certainly, in another implementation, when the frequency of the scheduling cell of the first cell belongs to the FR2, and the first cell is the secondary cell, a cell other than the scheduling cell of the first cell may also be selected as the second cell.

In the solution a3, the second cell may be a cell in cells that meet a first condition.

In this embodiment of this application, the first condition may be some preset rules, for example, a frequency is similar to that of the first cell. There may be one or more cells that meet the first condition. When there are a plurality of cells that meet the first condition, the second cell is one of the plurality of cells that meet the first condition, and there are a plurality of selection methods. For example, a cell with a minimum or maximum index in the plurality of cells that meet the first condition may be selected as the second cell. The cells that meet the first condition and selection of the second cell from the cells that meet the first condition are described in more detail in subsequent content.

Based on the foregoing content, one of the solution a1, the solution a2, and the solution a3 may be selected as a solution for selecting the second cell. Alternatively, two or more of the solution a1, the solution a2, and the solution a3 may be used in combination. For example, priorities may be set for the solution a1, the solution a2, and the solution a3. In a possible implementation, the solution a1 is preferentially selected. If the primary cell corresponding to the first cell cannot be used as the second cell (for example, the primary cell of the first cell is not a cell whose frequency belongs to the FR2), the solution a2 may be selected. When the scheduling cell of the first cell cannot be used as the second cell (for example, the scheduling cell of the first cell is not a cell whose frequency belongs to the FR2), the solution a3 may be selected. In another possible implementation, the solution a1 is preferentially selected. If the primary cell corresponding to the first cell cannot be used as the second cell (for example, the primary cell of the first cell is not a cell whose frequency belongs to the FR2), the solution a3 may be selected. In still another possible implementation, the solution a2 is preferentially selected. If the scheduling cell of the first cell cannot be used as the second cell, the solution a3 may be selected. In yet another possible implementation, the solution a1 is preferentially selected. If the primary cell corresponding to the first cell cannot be used as the second cell, the solution a2 may be selected. There may be other combinations, which are not enumerated.

For the solution a1, the solution a2, and the solution a3, in an optional implementation, an applicable condition may be added to one or more of the solution a1, the solution a2, and the solution a3. For example, the following solutions b1 to b5 may be used to determine the second cell.

In the solution b1, the second cell may be the primary cell corresponding to the first cell, and the frequency of the primary cell corresponding to the first cell belongs to the frequency range 2.

The frequency range 1 in this embodiment of this application may be written as a frequency range 1 in English, or may be written as an FR1 in this embodiment of this application. The frequency range 2 in this embodiment of this application may be written as a frequency range 2 in English, or may be written as an FR2 in this embodiment of this application. In 5G, a frequency is divided into a plurality of frequency ranges. The FR1 and the FR2 in this embodiment of this application refer to two frequency ranges. A minimum frequency in a frequency range of the FR2 may be greater than a minimum frequency in a frequency range of the FR1. The two frequency ranges FR1 and FR2 may have an intersection set or may not have an intersection set. The frequency ranges of the FR1 and the FR2 may be preset. An example of the FR1 and the FR2 may be as follows: The FR1 refers to a frequency range of 410 MHz to 7125 MHz, and the FR2 refers to a frequency range of 24150 MHz to 52600 MHz. It should be noted that during actual application, specific values corresponding to the FR1 and the FR2 may change. The foregoing values are merely examples, and are not intended to be limited.

In this application, a condition "if a frequency of a cell is an FR2" or a condition "if a frequency of a cell belongs to an FR1" may be replaced with "if a TCI-state configured in a cell does not have QCL of a typeD type" or "if a TCI-state of a control-resource set of a cell does not have QCL of a typeD type".

For the solution b1, in an optional implementation, when the frequency of the primary cell corresponding to the first cell belongs to the frequency range 2, and the first cell is the secondary cell, the primary cell corresponding to the first cell may be selected as the second cell. In another implementation, when the frequency of the primary cell corresponding to the first cell belongs to the frequency range 2, and the first cell is the secondary cell, a cell other than the primary cell corresponding to the first cell may be selected as the second cell.

In the solution b2, the second cell may be the scheduling cell of the first cell, and the frequency of the scheduling cell of the first cell belongs to the frequency range 2.

For the solution b2, in an optional implementation, when the frequency of the scheduling cell of the first cell belongs to the frequency range 2, the scheduling cell of the first cell may be selected as the second cell. In another implementation, when the frequency of the scheduling cell of the first cell belongs to the frequency range 2, a cell other than the scheduling cell of the first cell may be selected as the second cell.

In the solution b3, the second cell may be a cell in the cells that meet the first condition, and the frequency of the primary cell corresponding to the first cell belongs to the frequency range 1.

For the solution b3, in an optional implementation, when the frequency of the primary cell corresponding to the first cell belongs to the frequency range 1, and the first cell is the secondary cell, the cell in the cells that meet the first condition may be selected as the second cell. In another implementation, when the frequency of the primary cell corresponding to the first cell belongs to the frequency range 1, and the first cell is the secondary cell, a cell other than the cells that meet the first condition may be selected as the second cell.

In the solution b4, the second cell may be a cell in the cells that meet the first condition, and the frequency of the scheduling cell of the first cell belongs to the frequency range 1.

For the solution b4, in an optional implementation, when the frequency of the scheduling cell of the first cell belongs to the frequency range 1, the cell in the cells that meet the first condition may be selected as the second cell. In another implementation, when the frequency of the scheduling cell of the first cell belongs to the frequency range 1, a cell other than the cells that meet the first condition may be selected as the second cell.

In the solution b5, the second cell may be a cell in the cells that meet the first condition, the frequency of the primary cell corresponding to the first cell belongs to the frequency range 1, and the frequency of the scheduling cell of the first cell belongs to the frequency range 1.

For the solution b5, in an optional implementation, when the frequency of the primary cell corresponding to the first cell belongs to the frequency range 1, the first cell is the secondary cell, and the frequency of the scheduling cell of the first cell belongs to the frequency range 1, the cell in the cells that meet the first condition may be selected as the second cell. In another implementation, when the frequency of the primary cell corresponding to the first cell belongs to the frequency range 1, the first cell is the secondary cell, and the frequency of the scheduling cell of the first cell belongs to the frequency range 1, a cell other than the cells that meet the first condition may be selected as the second cell.

The eight solutions: the solution a1, the solution a2, the solution a3, the solution b1, the solution b2, the solution b3, the solution b4, and the solution b5 may be independently used or may be used in combination, to select the second cell. The eight solutions are independently used. For example, the solution a3 may be independently selected, to be specific, the second cell is the cell in the cells that meet the first condition. The eight solutions are used in combination. For example, two or more of the solution a1, the solution a2, and the solution a3 listed in the foregoing content are used in combination. For another example, the solution a1 and the solution b2 may be used in combination. For example, priorities are set for the solution a1 and the solution b2. For example, when the frequency of the scheduling cell of the first cell does not belong to the frequency range 2, the solution a1 is selected. For another example, a plurality of solutions in the solution b1 to the solution b5 may be used in combination.

For example, the solution b1, the solution b2, and the solution b5 may be selected and used in combination, and priorities may be set for the solution b1, the solution b2, and the solution b5. In this case, the primary cell of the first cell may be preferentially selected. If the frequency of the primary cell of the first cell is not the frequency range 2, it is further considered whether the frequency of the scheduling cell of the first cell belongs to the frequency range 2. If the frequency of the scheduling cell of the first cell does not belong to the frequency range 2, when the frequency of the primary cell corresponding to the first cell belongs to the frequency range 1, and the frequency of the scheduling cell of the first cell belongs to the frequency range 1, the cell in the cells that meet the first condition is selected as the first cell. For another example, the solution b1 and the solution a3 may be used in combination. In this case, the primary cell of the first cell may be preferentially selected. If the frequency of the primary cell of the first cell is not the frequency range 2, when the frequency of the primary cell corresponding to the first cell belongs to the frequency range 1, the cell in the cells that meet the first condition is selected as the first cell.

When the solution b1 and the solution b3 are used in combination, a solution for determining the second cell may be: When the frequency of the primary cell corresponding to the first cell belongs to the frequency range 2, the primary cell corresponding to the first cell is selected as the second cell. When the frequency of the primary cell corresponding to the first cell does not belong to the frequency range 2, the cell in the cells that meet the first condition is selected as the second cell. When the solution b2 and the solution b4 are used in combination, a solution for determining the second cell may be: When the frequency of the scheduling cell of the first cell belongs to the frequency range 2, the scheduling cell of the first cell is selected as the second cell. When the frequency of the scheduling cell of the first cell does not belong to the frequency range 2, the cell in the cells that meet the first condition is selected as the second cell.

In the solution a3, the solution b3, the solution b4, and the solution b5, there may be one or more cells that meet the first condition, and the second cell may be one of the cells that meet the first condition. The following provides several possible implementations of the first condition by using solutions c1 to c24.

In the condition c1, the first condition includes: a cell belonging to a cell group to which the first cell belongs.

In this embodiment of this application, the cell group (CG) may be an MCG or an SCG, or may be a cell combination in another form, for example, a group of cells that are configured by the network device or reported by the terminal device and that are different from the SCG and the MCG. For example, the cell group includes a group of cells used to simultaneously activate a same TCI-state. In other words, one or more TCI-states of a group of cells may be simultaneously activated by using one piece of signaling. For a definition of the cell group in this embodiment of this application, refer to a concept of CG in the protocol 38.214.

In the condition c2, the first condition includes: a cell belonging to a frequency band to which the first cell belongs.

In this embodiment of this application, a frequency band refers to a frequency segment obtained through division. For example, 20 MHz corresponding to 1900 MHz to 1920 MHz is a frequency band. For a related definition of the frequency band, refer to descriptions in the standard.

In the condition c3, the first condition includes: a cell belonging to a frequency band list to which the first cell belongs.

The cell in the frequency band list in this embodiment of this application may be configured by the network device, or may be a frequency band list including a plurality of frequency bands reported by the terminal device.

In the condition c4, the first condition includes: a cell configured with a control-resource set.

In the condition c5, the first condition includes: a cell configured with a CORESET 0.

In this embodiment of this application, the CORESET 0 may be configured by using a control-resource set zero parameter in RRC signaling, and is used to transmit downlink control information corresponding to a system information block 1 (SIB1).

In the condition c6, the first condition includes: a cell configured with a CORESET other than the CORESET 0.

In the condition c7, the first condition includes: a cell that is configured with a CORESET and in which a TCI-state of the configured CORESET has been activated.

In the condition c8, the first condition includes: a cell using frequency range 2.

In the condition c9, the first condition includes: a cell whose subcarrier spacing is the same as that of the first cell.

In this embodiment of this application, the subcarrier spacing refers to a spacing between subcarriers used for transmission.

The condition c1 to the condition c9 may be used independently. For example, the cells that meet the first condition include: the cell belonging to the cell group to which the first cell belongs. Certainly, a plurality of the condition c1 to the condition c9 may be used in combination. For example, the condition c1 and the condition c4 are used in combination. In this case, the cells that meet the first condition include: the cell that belongs to the cell group to which the first cell belongs and that is configured with the control-resource set. For another example, if the condition c1, the condition c4, and the condition c8 are used in combination, the cells that meet the first condition include: the cell that belongs to the cell group to which the first cell belongs and that is configured with the control-resource set and uses the frequency range 2. For the foregoing content, it should be noted that the conditions c5 and c6 are two conflicting conditions. When the conditions c5 and c6 are flexibly used in combination, the conditions c5 and c6 are not simultaneously selected.

In step 201, in this embodiment of this application, a range of cells that may be used as the second cell may include a plurality of cells. For example, there are a plurality of scheduling cells of the first cell. For another example, there are a plurality of cells that meet the first condition. In this case, one cell may be selected from the cells as the second cell, and the cell may be randomly selected, or may be selected based on one or more cell-related parameters such as an index and a frequency of the cell. During specific implementation, there are a plurality of manners for selecting the second cell. In this embodiment of this application, a solution d1, a solution d2, and a solution d3 are provided, to be used to select one cell from the cells that meet the first condition as the second cell.

In the solution d1, the second cell is a cell with a minimum index in the cells that meet the first condition.

In the solution d2, the second cell is a cell with a maximum index in the cells that meet the first condition.

In the solution d3, the second cell is a cell whose frequency is the most similar to that of the first cell in the cells that meet the first condition.

In the solution d4, if there are a plurality of cells, in the cells that meet the first condition, whose frequencies are the most similar to that of the first cell, the second cell is a cell, with a minimum index in the cells that meet the first condition, whose frequency is the most similar to that of the first cell.

In the solution d5, if there are a plurality of cells, in the cells that meet the first condition, whose frequencies are the most similar to that of the first cell, the second cell is a cell, with a maximum index in the cells that meet the first condition, whose frequency is the most similar to that of the first cell.

In step 201, there are one or more resources of the second cell. When one resource is selected from the plurality of resources of the second cell, there may be a plurality of implementations. One resource may be randomly selected, or may be selected in another manner. The following describes an implementation of selecting a resource from the second cell as the first resource by using a solution e1, a solution e2, a solution e3, a solution e4, and a solution e5.

In the solution e1, the first resource includes: a resource in a spatial relation for uplink transmission in the second cell.

In the solution e1, there are a plurality of implementations. In a possible implementation, the spatial relation for uplink transmission in the second cell may be used as uplink transmission of a same type in the first cell. For example, a spatial relation of a PUCCH in the second cell may be used as a spatial relation for performing uplink transmission of the PUCCH in the first cell. For another example, a spatial relation of a PUSCH in the second cell is used as a spatial relation for performing uplink transmission of the PUSCH in the first cell. For still another example, a spatial relation of an SRS in the second cell is used as a spatial relation for performing uplink transmission of the SRS in the first cell. In a possible implementation, the spatial relation for uplink transmission in the second cell may alternatively be used as uplink transmission of another type in the first cell. For example, a spatial relation of a PUCCH in the second cell may be used as a spatial relation for performing uplink transmission of an SRS or the PUCCH in the first cell. For another example, a spatial relation of a PUSCH in the second cell is used as a spatial relation for performing uplink transmission of an SRS or the PUSCH in the first cell. For still another example, a spatial relation of an SRS in the second cell is used as a spatial relation for performing uplink transmission of a PUCCH or a PUSCH in the first cell.

In the solution e2, the first resource includes: in the second cell, for example, in a bandwidth part currently activated in the second cell, a reference signal resource corresponding to a currently activated TCI-state of a control-resource set with a minimum or maximum index in one or more control-resource sets that are obtained by the terminal device through monitoring last time (for example, a reference signal resource in QCL-info of a typeD type), namely, a reference signal resource used to indicate quasi-co-location information (for example, quasi-co-location information of the typeD type) of a PDCCH corresponding to the control-resource set. That is, a spatial reception parameter/reception beam in the foregoing control-resource set is used as a spatial transmission parameter/transmission beam for uplink transmission in the first cell.

In the solution e2, the one or more control-resource sets that are obtained through monitoring last time may refer to one or more control-resource sets that are obtained through monitoring last time in a slot.

In this embodiment of this application, in the solution e2, the reference signal resource corresponding to the TCI-state may be a reference signal resource in QCL-info of a typeA type or a reference signal resource in QCL-info of a typeD type in the TCI-state. In other words, the quasi-co-location information may refer to quasi-co-location information of a typeD type or quasi-co-location information of a typeA type. The reference signal resource used to indicate the quasi-co-location information of the physical downlink control channel may specifically refer to a reference signal resource in the QCL-info of the typeD or the typeA of the currently activated TCI-state of the CORESET, or may refer to a reference signal resource for transmission of the PDCCH corresponding to the CORESET. In this embodiment of this application, that the reference signal resource may be used to determine the transmission beam for the uplink transmission may specifically mean that a reception beam of the reference signal resource is used as a reception beam of the PDCCH corresponding to the CORESET.

In a possible implementation, when the reception beam of the PDCCH in the second cell is used as the transmission beam for the uplink transmission in the first cell (where the transmission beam may be understood as a spatial relation), because the reception beam of the PDCCH is determined by using the TCI-state of the CORESET corresponding to the PDCCH, when a plurality of CORESETs are configured in the second cell, a TCI-state of one of the CORESETs may be specifically used to determine the transmission beam for the uplink transmission. For example, the transmission beam for the uplink transmission may be determined by using the reference signal resource in the TCI-state of the CORESET with the minimum or maximum index in the plurality of configured CORESETs.

In the solution e3, the first resource includes: in a bandwidth part currently activated in the second cell, a reference signal resource in a TCI-state with a minimum or maximum index in TCI-states that are used for transmission of a PDSCH.

There may also be an optional implementation. The first resource includes: in the bandwidth part currently activated in the second cell, a reference signal resource in QCL-info of a typeD type in the TCI-state with the minimum or maximum index in the TCI-states that are used for transmission of the physical downlink shared channel.

There may also be an optional implementation. The first resource includes: in the bandwidth part currently activated in the second cell, a reference signal resource in QCL-info of a typeA type in the TCI-state with the minimum or maximum index in the TCI-states that are used for transmission of the physical downlink shared channel.

In this embodiment of this application, that a reference signal resource in one TCI-state is used as the first resource may be understood as that a reception beam corresponding to the TCI-state is used as a transmission beam used by the terminal device to perform uplink transmission in the first cell. For example, after the first resource is determined by using the solution e3, when performing uplink transmission in the first cell, the terminal device uses, in the bandwidth part currently activated in the second cell, the reception beam of the reference signal resource in the TCI-state with the minimum or maximum index in the TCI-states that are used for transmission of the physical downlink shared channel as the transmission beam.

In a possible implementation, when the reception beam of the PDSCH in the second cell is used as the transmission beam for the uplink transmission, because the reception beam of the PDSCH is also determined by using the TCI-state, optionally, the network device first activates a plurality of TCI-states for the PDSCH, and each TCI-state corresponds to a field value of a TC field in the PDCCH. Before performing transmission of the PDSCH, the network device sends the PDCCH to the terminal device, and indicates one of the TCI-states by using the TCI field in the PDCCH. In this way, the terminal device may know the TCI-state used by the PDSCH. That the reception beam of the PDSCH is used as the transmission beam for the uplink transmission may also be expressed as that the TCI-state of the PDSCH is used to determine the transmission beam for the uplink transmission. Because the network device may activate a plurality of TCI-states for the terminal device, one of the TCI-states may be used to determine the transmission beam for the uplink transmission. In an optional implementation, a reference signal resource in one of the TCI-states that are used for transmission of the PDSCH and that are currently activated in the second cell may be used to determine the transmission beam for the uplink transmission. For example, a reference signal resource in a TCI-state with a minimum or maximum index in the TCI-states may be used. For another example, a reference signal resource in a TCI-state corresponding to a minimum or maximum TCI field value may be used.

In the solution e4, the first resource includes: a resource of an SSB used when the terminal device performs an initial access process in the second cell.

In this embodiment of this application, that a resource of one SSB is used as the first resource may be understood as that a reception beam corresponding to the SSB is used as the transmission beam used by the terminal device to perform uplink transmission in the first cell, or may be understood as that the resource of the SSB is used as the reference signal resource used by the terminal device to perform uplink transmission in the first cell.

In the solution e4, in a process of accessing the second cell, the terminal device sends a random access message, for example, a random access message 1, a random access message 2, a random access message 3, or a random access message 4. In an optional implementation, the first resource may also include a resource used to send the random access message 1 in the process of accessing the second cell. In another optional implementation, the first resource may also include a resource used to send the random access message 3 in the process of accessing the second cell. In still another optional implementation, the first resource may also include a resource used to receive an acknowledgment message of the random access message 2 in the process of accessing the second cell. In yet another optional implementation, the first resource may also include a resource used to receive an acknowledgment message of the random access message 4 in the process of accessing the second cell. In this embodiment of this application, the random access process is divided into four parts, and may correspond to four messages. The random access message 1 is the first message in the random access process, the random access message 2 is the second message in the random access process, the random access message 3 is the third message in the random access process, and the random access message 4 is the fourth message in the random access process.

In the solution e5, the first resource includes: an SSB used by the terminal device to receive a system message.

In this embodiment of this application, that the resource of the SSB used to receive the system message is used as the first resource may be understood as that the terminal device receives the system message by using a specific SSB, and a reception beam of the specific SSB is used as the transmission beam for the uplink transmission.

In the solution e6, the first resource includes: a reference signal resource for road loss measurement in the second cell.

In the solution e6, that one reference signal resource for road loss measurement is used as the first resource may be understood as that a reception beam corresponding to the reference signal resource for road loss measurement is used as the transmission beam used by the terminal device to perform uplink transmission in the first cell, or may be understood as that the reference signal resource for road loss measurement is used as the reference signal resource used by the terminal device to perform uplink transmission in the first cell.

There is one or more reference signal resources for road loss measurement. When there are a plurality of reference signal resources for road loss measurement, the terminal device may determine the first resource based on one or more of the following content of the reference signal resource for road loss measurement in the second cell:
  an index value of the reference signal resource for road loss measurement;
  a road loss measurement value of the reference signal resource for road loss measurement;
  quality of the reference signal resource for road loss measurement;
  a measurement periodicity of the reference signal resource for road loss measurement; and
  measurement time of the reference signal resource for road loss measurement.

In this embodiment of this application, the reference signal resource for road loss measurement is a reference signal resource used for road loss measurement. The PUCCH, the PUSCH, and the SRS all have corresponding reference signal resources for road loss measurement.

For the SRS, in the solution e5, a reference signal resource for road loss measurement that is used for the SRS in the second cell may be used as the first resource. When there are a plurality of reference signal resources for road loss measurement that are used for the SRS in the second cell, one of the reference signal resources for road loss measurement may be selected. For example, a reference signal resource for road loss measurement, with a maximum or minimum index, that is used for the SRS may be selected, or a reference signal resource for road loss measurement with a minimum road loss measurement value may be selected. However, when there are a plurality of reference signal resources for road loss measurement, with a minimum road loss measurement value, that are used for the SRS, one may continue to be selected from the reference signal resources for road loss measurement, with the minimum road loss measurement value, that are used for the SRS as the first resource. For example, a reference signal resource for road loss measurement with a maximum or minimum index value may be selected from the reference signal resources for road loss measurement, with the minimum road loss measurement value, that are used for the SRS as the first resource. That is, the reference signal resource for road loss measurement is selected based on one or more parameters of the reference signal resource for road loss measurement in the second cell, such as the index value, the road loss measurement value, the quality, the measurement periodicity, and the measurement time.

For the PUCCH, in the solution e5, a reference signal resource for road loss measurement that is used for the PUCCH in the second cell may be used as the first resource. When there are a plurality of reference signal resources for road loss measurement that are used for the PUCCH in the second cell, one of the reference signal resources for road loss measurement may be selected. For example, one reference signal resource for road loss measurement with a maximum or minimum index in reference signal resources for road loss measurement that are included in a PUCCH-power control (PUCCH-PowerControl) parameter may be selected, or one reference signal resource for road loss measurement with a minimum road loss measurement value may be selected. However, when there are a plurality of reference signal resources for road loss measurement, with a minimum road loss measurement value, that are used for the PUCCH, one may continue to be selected from the reference signal resources for road loss measurement, with the minimum road loss measurement value, that are used for the PUCCH as the first resource. For example, a reference signal resource for road loss measurement with a minimum index value may be selected from the reference signal resources for road loss measurement, with the minimum road loss measurement value, that are used for the PUCCH as the first resource. That is, the reference signal resource for road loss measurement is selected based on one or more parameters of the reference signal resource for road loss measurement in the second cell, such as the index value, the road loss measurement value, the quality, the measurement periodicity, and the measurement time.

For the PUSCH, in the solution e5, a reference signal resource for road loss measurement that is used for the PUSCH in the second cell may be used as the first resource. When there are a plurality of reference signal resources for road loss measurement that are used for the PUSCH in the second cell, one of the reference signal resources for road loss measurement may be selected. For example, one reference signal resource for road loss measurement with a maximum or minimum index in reference signal resources for road loss measurement that are included in a PUSCH-power control (PUSCH-PowerControl) parameter may be selected, or one reference signal resource for road loss measurement with a minimum road loss measurement value may be selected. However, when there are a plurality of reference signal resources for road loss measurement, with a minimum road loss measurement value, that are used for the PUSCH, one may continue to be selected from the reference signal resources for road loss measurement, with the minimum road loss measurement value, that are used for the PUSCH as the first resource. For example, a reference signal resource for road loss measurement with a minimum index value may be selected from the reference signal resources for road loss measurement, with the minimum road loss measurement value, that are used for the PUSCH as the first resource. That is, the reference signal resource for road loss measurement is selected based on one or more parameters of the reference signal resource for road loss measurement in the second cell, such as the index value, the road loss measurement value, the quality, the measurement periodicity, and the measurement time.

Optionally, the reference signal resource for road loss measurement that is used for the PUSCH in the second cell may be selected as the first resource, to determine the transmission beam for transmission of the PUCCH and the SRS. Alternatively, the reference signal resource for road loss measurement that is used for the PUCCH in the second cell may be selected as the first resource, to determine the transmission beam for transmission of the PUSCH and the SRS. Alternatively, the reference signal resource for road loss measurement that is used for the SRS in the second cell may be selected as the first resource, to determine the transmission beam for transmission of the PUCCH and the PUSCH.

The terminal device may select any one of the solutions e1 to e6, or may select one based on a priority, to be specific, select one solution first, and if a condition of the solution is not met, select another solution. For example, the solution e2 is preferentially selected. If a condition of the solution e2 is not met, the solution e4 is selected. For example, in the bandwidth part currently activated in the second cell, the reference signal resource corresponding to the currently activated TCI-state of the control-resource set with the minimum or maximum index in the one or more control-resource sets that are obtained by the terminal device through monitoring last time, namely, the reference signal resource used to indicate the quasi-co-location information of the PDCCH corresponding to the control-resource set, is preferentially selected. If no TCI-state is activated in the control-resource set, or no TCI-state is activated in the control-resource set in the second cell, when the terminal device performs the initial access process in the second cell, the used resource of the SSB is used.

In step 202, the uplink transmission performed by the terminal device in the first cell may include a plurality of types. For example, in a possible implementation, the uplink transmission is uplink transmission of a PUCCH. For another example, the uplink transmission is uplink transmission of a PUSCH. For still another example, the uplink transmission is uplink transmission of an SRS.

In an optional implementation, in step 202, the uplink transmission of the PUCCH may be a dedicated PUCCH. In another optional implementation, the uplink transmission of the SRS may be a specific type of SRS, for example, an SRS for codebook-based uplink transmission (namely, an SRS in an SRS resource set whose usage parameter is codebook), or an SRS for antenna selection (namely, an SRS in an SRS resource set whose usage parameter is antenna switching).

In this embodiment of this application, in addition to determining the spatial relation for uplink transmission of the first cell by using the first resource of the second cell in step 201, the spatial relation for uplink transmission of the first cell may be further determined in another manner. For example, the following solutions f1 and f2 may be used to determine the spatial relation for uplink transmission.

In the solution f1, the spatial relation for uplink transmission of the first cell may be determined by using a second resource of the first cell.

In the solution f1, for example, the reference signal for road loss measurement of the first cell may be used to determine the transmission beam for uplink transmission. Optionally, a condition is that a road loss resource for uplink transmission is configured in the first cell.

In the solution f2, the uplink transmission is performed based on the spatial relation that is delivered by the network device and that is used by the terminal device to perform uplink transmission in the first cell.

Optionally, the spatial relation that is delivered by the network device and that is used to enable the terminal device to perform uplink transmission in the first cell may be carried in downlink signaling, such as RRC signaling, media access control control element (MAC CE) signaling, or DCI signaling.

One of the solution f1, the solution f2, and the three solutions provided in step 201 may be selected, to be used to determine the spatial relation for uplink transmission of the first cell. Alternatively, different usage conditions may be set for the three solutions, for example, the solution f1 is used in a specific condition, the solution f2 is used in a specific condition, and the solutions provided in step 201 are used in a specific condition.

In a possible implementation, the spatial relation for uplink transmission of the first cell may be preferentially determined based on the solution f1. When an appropriate second resource of the first cell cannot be found to determine the spatial relation for uplink transmission of the first cell (for example, when no reference signal resource for road loss measurement that corresponds to uplink measurement is configured), the spatial relation for uplink transmission of the first cell is determined based on the solutions provided in step 201. When an appropriate first resource of the second cell cannot be found to determine the spatial relation for uplink transmission of the first cell (for example, when the frequency, of the second cell, determined in step 201 belongs to the FR1), the spatial relation for uplink transmission of the first cell is determined by using the solution f2. That is, if the terminal device cannot refer to the second resource of the cell (for example, when no reference signal resource for road loss measurement that corresponds to uplink measurement is configured), and cannot refer to the first resource of the second cell (for example, when the frequency, of the second cell, determined in step 201 belongs to the FR1), to determine the spatial relation for uplink transmission, the network device needs to explicitly indicate the spatial relation for uplink transmission to the terminal device.

In another possible implementation, the spatial relation for uplink transmission of the first cell is preferentially determined based on the solution f1. When an appropriate second resource of the first cell cannot be found to determine the spatial relation for uplink transmission of the first cell (for example, when no reference signal resource for road loss measurement that corresponds to uplink measurement is configured), the spatial relation for uplink transmission of the first cell is determined by using the solution f2. That is, if the cell has no reference signal resource for road loss measurement that can be referenced, the network device needs to explicitly indicate the spatial relation for uplink transmission to the terminal device.

In still another possible implementation, the spatial relation for uplink transmission of the first cell is preferentially determined based on the solutions provided in step 201. When an appropriate first resource of the second cell cannot be found to determine the spatial relation for uplink transmission of the first cell (for example, when the frequency, of the second cell, determined in step 201 belongs to the FR1), the spatial relation for uplink transmission of the first cell is determined by using the solution f2. That is, if the terminal device cannot refer to the first resource of the second cell, to determine the spatial relation for uplink transmission, for example, when the frequency, of the second cell, determined in step 201 belongs to the FR1, the network device needs to explicitly indicate the spatial relation for uplink transmission to the terminal device.

In step 201, in a possible implementation, the spatial relation for uplink transmission of the first cell is determined by using the first resource of the second cell only when a second condition is met. If the second condition is not met, the spatial relation for uplink transmission of the first cell cannot be determined based on the solutions provided in step 201. That is, if the second condition is not met, the spatial relation for uplink transmission of the first cell may be determined in another manner (for example, the solution f1 or the solution f2) except the solutions provided in step 201. Certainly, when the second condition is met, obtaining the spatial relation for uplink transmission of the terminal device in step 202 is only an optional implementation. Alternatively, when the second condition is met, the spatial relation for uplink transmission of the terminal device may be obtained by using the solution f2.

There are a plurality of implementations of the second condition. The following lists several possible implementations of the second condition by using a condition g1, a condition g2, a condition g3, a condition g4, and a condition g5.

In the condition g1, the second condition may include: No spatial relation for uplink transmission is configured in the first cell.

In the condition g2, the second condition may include: No CORESET is configured in the first cell.

In the condition g3, the second condition may include: No CORESET is configured in a downlink bandwidth part currently activated in the first cell.

In the condition g4, the second condition may include: No TCI-state that is used for transmission of the PDSCH is activated in a downlink bandwidth part currently activated in the first cell.

In the condition g5, the second condition may include: No TCI-state that is used for transmission of the PDSCH is activated in the first cell.

In the condition g6, the second condition may include: No reference signal resource for road loss measurement is configured in the first cell.

In the condition g7, the second condition may include: The first cell is a secondary cell, and a frequency of a primary cell corresponding to the first cell is an FR2.

In the condition g8, the second condition may include: The first cell is a secondary cell, and a frequency of a scheduling cell corresponding to the first cell is an FR2.

In the condition g9, the second condition may include: The first cell is a secondary cell, and a primary cell corresponding to the first cell has a same subcarrier spacing as that of the first cell.

In the condition g10, the second condition may include: The first cell is a secondary cell, and a scheduling cell corresponding to the first cell has a same subcarrier spacing as that of the first cell.

In the condition g11, the second condition may include: The terminal device has uplink-downlink beam reciprocity, for example, the terminal device reports a beamCorrespondenceWithoutUL-BeamSweeping capability.

It should be noted that the condition g1 to the condition g11 may be independently used. For example, the condition g1 is independently used. When the spatial relation for uplink transmission is not configured in the first cell, the terminal device determines the spatial relation for uplink transmission of the first cell by using the first resource in the second cell.

Certainly, a plurality of items of the condition g1 to the condition g11 may be used in combination, for example, the condition g1, the condition g2, and the condition g4 are used in combination. In this case, step 201 specifically includes: When no spatial relation for uplink transmission is configured in the first cell, no CORESET is configured in the first cell, and no TCI-state that is used for transmission of the PDSCH is activated in the downlink bandwidth part currently activated in the first cell, the terminal device determines the spatial relation for uplink transmission of the first cell by using the first resource in the second cell.

For example, the condition g1, the condition g2, the condition g4, and the condition g7 are used in combination. In this case, step 201 specifically includes: When no spatial relation for uplink transmission is configured in the first cell, no CORESET is configured in the first cell, no TCI-state that is used for transmission of the PDSCH is activated in the downlink bandwidth part currently activated in the first cell, and the frequency of the primary cell corresponding to the first cell belongs to the FR2, the terminal device determines the spatial relation for uplink transmission of the first cell by using the first resource in the second cell (namely, the primary cell of the first cell).

For another example, the condition g2, the condition g5, and the condition g7 are used in combination. In an optional implementation, "the frequency of the primary cell corresponding to the first cell belongs to the FR2, no CORESET is configured in the first cell, and no TCI-state that is used for transmission of the PDSCH is not activated in the first cell, the spatial relation for uplink transmission of the SRS may be determined based on the reference signal resource in the QCL corresponding to the CORESET with the minimum index in the one or more control-resource sets that are obtained through monitoring last time in the bandwidth part currently activated in the secondary cell."

Corresponding English of the optional implementation may be "For a CC in FR2, if no CORESET is configured and no TCI-state is activated, the default spatial relation for SRS is determined by QCL assumption of the CORESET with the lowest ID in the most recent monitored downlink slot within the active BWP on Pcell".

In the foregoing embodiment, the condition g2, the condition g5, and the condition g7 are combined with the foregoing solution for selecting the first resource. This is merely an example, and is not limited herein. In this example, an optional implementation of "the reference signal resource in the QCL corresponding to the CORESET with the minimum index" may be: the reference signal resource corresponding to the currently activated TCI-state of the CORESET with the minimum index (for example, the reference signal resource in the QCL-info of the typeD type).

For another example, the condition g1, the condition g2, the condition g5, and the condition g6 are used in combination. In this case, step 201 specifically includes: When the spatial relation for uplink transmission and the reference signal resource for road loss measurement are not configured in the first cell, no CORESET is configured in the first cell, and no TCI-state that is used for transmission of the PDSCH is activated in the first cell, the terminal device determines the spatial relation for uplink transmission of the first cell by using the first resource in the second cell.

The foregoing content further mentions that if the second condition is not met, the spatial relation for uplink transmission of the first cell may be determined in another manner (for example, the solution f1 or the solution f2) except the solutions in step 201. For example, the condition g6 is used independently. When the terminal device has uplink-downlink beam reciprocity, step 201 is performed. Optionally, when the terminal device does not have uplink-downlink beam reciprocity, the solution f2 is performed.

For the solution f2, in an optional implementation, a rule for delivering, by the network device side, the spatial relation of the terminal device may be set. For example, when a third condition is met, the network device may deliver, to the terminal device, the spatial relation used to enable the terminal device to perform uplink transmission in the first cell. It can be learned that only when the third condition is met, the network device delivers, to the terminal device, the spatial relation used to enable the terminal device to perform uplink transmission in the first cell. This reduces a frequency of delivering the spatial relation by the network device, thereby reducing signaling overheads.

In another implementation, when the spatial relation used to enable the terminal device to perform uplink transmission in the first cell is updated, and the third condition is met, the network device delivers, to the terminal device, the spatial relation used to enable the terminal device to perform uplink transmission in the first cell. It may be learned that, when the spatial relation used to enable the terminal device to perform uplink transmission in the first cell is updated, and only when the third condition is met, the network device delivers, to the terminal device, the spatial relation used to enable the terminal device to perform uplink transmission in the first cell. Instead of being the same as that in a conventional technology, if the spatial relation used to enable the terminal device to perform uplink transmission in the first cell is updated, the spatial relation used to enable the terminal device to perform uplink transmission in the first cell is delivered. In this way, a frequency of delivering the spatial relation by the network device can be reduced, thereby reducing signaling overheads.

The third condition may be a preset rule. For example, the third condition may include: The first cell is the secondary cell, the frequency of the primary cell corresponding to the first cell belongs to the FR1, no CORESET is configured in the first cell, and no TCI-state that is used for transmission of the PDSCH is activated in the first cell. For another example, the third condition may include: No CORESET is configured in the first cell, and no TCI-state that is used for an active state of the PDSCH is configured in the first cell. For still another example, the third condition may include: The terminal device does not have uplink-downlink beam reciprocity. In this example, only when the terminal device has uplink-downlink beam reciprocity, the reception beam of the first resource or the second resource may be determined as the transmission beam used by the terminal device to perform uplink transmission in the first cell.

In the solution f1, there are a plurality of types of resources of the first cell, and a plurality of options may be provided for specific reference. In this embodiment of this application, a resource that belongs to the first cell and that is referenced is referred to as the second resource. The following provides several possible solutions for determining the second resource by using a solution h1, a solution h2, and a solution h3.

In the solution h1, the second resource includes: in a bandwidth part currently activated in the first cell, a reference signal resource used to indicate quasi-co-location information of a PDCCH in a control-resource set with a minimum or maximum index in one or more control-resource sets that are obtained by the terminal device through monitoring last time.

In the solution h1, the one or more control-resource sets that are obtained through monitoring last time may refer to one or more control-resource sets that are obtained through monitoring last time in a slot.

In this embodiment of this application, in the solution h1, quasi-co-location may refer to quasi-co-location of a typeD. The reference signal resource used to indicate the quasi-co-location information of the physical downlink control channel may specifically refer to a reference signal resource in the QCL-info of the typeD of the currently activated TCI-state of the CORESET, or may refer to a reference signal resource for transmission of the PDCCH corresponding to the CORESET. In this embodiment of this application, that the reference signal resource may be used may specifically mean that a reception beam of the reference signal resource is used as a reception beam of the PDCCH corresponding to the CORESET.

In a possible implementation, when the reception beam of the PDCCH in the first cell is used as the transmission beam for uplink transmission in the first cell (where the transmission beam may be understood as a spatial relation), because the reception beam of the PDCCH is determined by using the TCI-state of the CORESET corresponding to the PDCCH, when a plurality of CORESETs are configured in the first cell, a TCI-state of one of the CORESETs may be specifically used to determine the transmission beam for the uplink transmission. For example, the transmission beam for the uplink transmission may be determined by using the reference signal resource in the TCI-state of the CORESET with the minimum or maximum index in the plurality of configured CORESETs.

In the solution h2, the second resource includes: in a bandwidth part currently activated in the first cell, a reference signal resource in a TCI-state with a minimum or maximum index in TCI-states that are used for transmission of a PDSCH.

There may also be an optional implementation. The second resource includes: in the bandwidth part currently activated in the first cell, a reference signal resource in QCL-info of a typeD type in the TCI-state with the minimum or maximum index in the activated TCI-states that are used for transmission of the physical downlink shared channel.

There may also be an optional implementation. The second resource includes: in the bandwidth part currently activated in the first cell, a reference signal resource in QCL-info of a typeA type in the TCI-state with the minimum or maximum index in the TCI-states that are used for transmission of the physical downlink shared channel.

In this embodiment of this application, that a reference signal resource in one TCI-state is used as the second resource may be understood as that a reception beam corresponding to the TCI-state is used as a transmission beam used by the terminal device to perform uplink transmission in the first cell. For example, after the second resource is determined by using the solution h2, when performing uplink transmission of the first cell, the terminal device uses, in the bandwidth part currently activated in the first cell, the reception beam of the reference signal resource in the TCI-state with the minimum or maximum index in the TCI-states that are used for transmission of the physical downlink shared channel as the transmission beam.

In a possible implementation, when the reception beam of the PDSCH in the first cell is used as the transmission beam for the uplink transmission, because the reception beam of the PDSCH is also determined by using the TCI-state, optionally, the network device first activates a plurality of TCI-states for the PDSCH, and each TCI-state corresponds to a field value of a TCI field in the PDCCH. Before performing transmission of the PDSCH, the network device sends the PDCCH to the terminal device, and indicates one of the TCI-states by using the TCI field in the PDCCH. In this way, the terminal device may know the TCI-state used by the PDSCH. That the reception beam of the PDSCH is used as the transmission beam for the uplink transmission may also be expressed as that the TCI-state of the PDSCH is used to determine the transmission beam for the uplink transmission. Because the network device may activate a plurality of TCI-states for the terminal device, one of the TCI-states may be used to determine the transmission beam for the uplink transmission. In an optional implementation, a reference signal resource in one of the TCI-states that are used for transmission of the PDSCH and the are currently activated in the first cell may be used to determine the transmission beam for the uplink transmission. For example, a reference signal resource in a TCI-state with a minimum or maximum index in the TCI-states may be used. For another example, a reference signal resource in a TCI-state corresponding to a minimum or maximum TCI field value may be used.

In the solution h3, the second resource includes: a reference signal resource for road loss measurement in the first cell.

In the solution h3, that one reference signal resource for road loss measurement is used as the second resource may be understood as that a reception beam corresponding to the reference signal resource for road loss measurement is used as the transmission beam used by the terminal device to perform uplink transmission in the first cell, or may be understood as that the reference signal resource for road loss measurement is used as the reference signal resource used by the terminal device to perform uplink transmission in the first cell.

There is one or more reference signal resources for road loss measurement. When there are a plurality of reference signal resources for road loss measurement, the terminal device may determine the second resource based on one or more of the following content of the reference signal resource for road loss measurement in the first cell:
  an index value of the reference signal resource for road loss measurement;
  a road loss measurement value of the reference signal resource for road loss measurement;
  quality of the reference signal resource for road loss measurement;
  a measurement periodicity of the reference signal resource for road loss measurement; and
  measurement time of the reference signal resource for road loss measurement.

In this embodiment of this application, the reference signal resource for road loss measurement is a reference signal resource used for road loss measurement. The PUCCH, the PUSCH, and the SRS all have corresponding reference signal resources for road loss measurement.

For the SRS, in the solution e5, a reference signal resource for road loss measurement that is used for the SRS in the first cell may be used as the second resource. When there are a plurality of reference signal resources for road loss measurement that are used for the SRS in the first cell, one of the reference signal resources for road loss measurement may be selected. For example, a reference signal resource for road loss measurement, with a maximum or minimum index, that is used for the SRS may be selected, or a reference signal resource for road loss measurement with a minimum road loss measurement value may be selected. However, when there are a plurality of reference signal resources for road loss measurement, with a minimum road loss measurement value, that are used for the SRS, one may continue to be selected from the reference signal resources for road loss measurement, with the minimum road loss measurement value, that are used for the SRS as the second resource. For example, a reference signal resource for road loss measurement with a maximum or minimum index value may be selected from the reference signal resources for road loss measurement, with the minimum road loss measurement value, that are used for the SRS as the second resource. That is, the reference signal resource for road loss measurement is selected based on one or more parameters of the reference signal resource for road loss measurement in the first cell, such as the index value, the road loss measurement value, the quality, the measurement periodicity, and the measurement time.

For the PUCCH, in the solution e5, a reference signal resource for road loss measurement that is used for the PUCCH in the first cell may be used as the second resource. When there are a plurality of reference signal resources for road loss measurement that are used for the PUCCH in the first cell, one of the reference signal resources for road loss measurement may be selected. For example, one reference signal resource for road loss measurement with a maximum or minimum index in reference signal resources for road loss measurement that are included in a PUCCH-power control (PUCCH-PowerControl) parameter may be selected, or one reference signal resource for road loss measurement with a minimum road loss measurement value may be selected. However, when there are a plurality of reference signal resources for road loss measurement, with a minimum road loss measurement value, that are used for the PUCCH, one may continue to be selected from the reference signal resources for road loss measurement, with the minimum road loss measurement value, that are used for the PUCCH as the second resource. For example, a reference signal resource for road loss measurement with a minimum index value may be selected from the reference signal resources for road loss measurement, with the minimum road loss measurement value, that are used for the PUCCH as the second resource. That is, the reference signal resource for road loss measurement is selected based on one or more parameters of the reference signal resource for road loss measurement in the first cell, such as the index value, the road loss measurement value, the quality, the measurement periodicity, and the measurement time.

For the PUSCH, in the solution e5, a reference signal resource for road loss measurement that is used for the PUSCH in the first cell may be used as the second resource. When there are a plurality of reference signal resources for road loss measurement that are used for the PUSCH in the first cell, one of the reference signal resources for road loss measurement may be selected. For example, one reference signal resource for road loss measurement with a maximum or minimum index in reference signal resources for road loss measurement that are included in a PUSCH-power control (PUSCH-PowerControl) parameter may be selected, or one reference signal resource for road loss measurement with a minimum road loss measurement value may be selected. However, when there are a plurality of reference signal resources for road loss measurement, with a minimum road loss measurement value, that are used for the PUSCH, one may continue to be selected from the reference signal resources for road loss measurement, with the minimum road loss measurement value, that are used for the PUSCH as the second resource. For example, a reference signal resource for road loss measurement with a minimum index value may be selected from the reference signal resources for road loss measurement, with the minimum road loss measurement value, that are used for the PUSCH as the second resource. That is, the reference signal resource for road loss measurement is selected based on one or more parameters of the reference signal resource for road loss measurement in the first cell, such as the index value, the road loss measurement value, the quality, the measurement periodicity, and the measurement time.

Optionally, the reference signal resource for road loss measurement that is used for the PUSCH in the first cell may be selected as the second resource, to determine the transmission beam for transmission of the PUCCH and the SRS. Alternatively, the reference signal resource for road loss measurement that is used for the PUCCH in the first cell may be selected as the second resource, to determine the transmission beam for transmission of the PUSCH and the SRS. Alternatively, the reference signal resource for road loss measurement that is used for the SRS in the first cell may be selected as the second resource, to determine the transmission beam for transmission of the PUCCH and the PUSCH.

It should be noted that, in this embodiment of this application, the foregoing several solutions for determining the second resource may be used independently, or certainly may be used in combination, and priorities of the solutions are set.

For example, if the reference signal resource for road loss measurement is configured in the first cell, the reference signal resource for road loss measurement is used as the second resource; otherwise, the second resource may be determined by using the solution h1 or the solution h2.

For another example, regardless of whether the reference signal resource for road loss measurement is configured in the first cell, the second resource is determined by using the solution h1 or the solution h2.

For still another example, the solution h1 is preferentially used. If no CORESET is configured in the first cell, the solution h2 is used. If no second resource that meets the requirement cannot be determined by using the solution h2, when the reference signal resource for road loss measurement is configured in the first cell, the second resource is determined by using the solution h3.

For yet another example, the solution h1 is preferentially used. If no CORESET is configured in the first cell, the solution h2 is used. If no second resource that meets the requirement is determined by using the solution h2, the method provided in step 201 is used to determine the first resource, and perform uplink transmission based on the first resource.

It should be noted that, in this embodiment of this application, the transmission beam used by the terminal device to perform uplink transmission in the first cell is determined based on the reception beam of the first resource of the second cell. When the reception beam of the first resource is updated, the terminal device determines, based on the updated reception beam of the first resource of the second cell, the transmission beam used by the terminal device to perform uplink transmission in the first cell. In another optional implementation, in this embodiment of this application, the transmission beam used by the terminal device to perform uplink transmission in the first cell is determined based on the reception beam of the second resource of the first cell. When the reception beam of the second resource is updated, the terminal device determines, based on the updated reception beam of the second resource of the first cell, the transmission beam used by the terminal device to perform uplink transmission in the first cell.

For the foregoing methods for determining the spatial relation for uplink transmission of the terminal device, the network device may indicate, to the terminal device by using RRC signaling, MAC CE signaling, or DCI signaling, a method that is specifically used. Certainly, priorities or applicable conditions of several methods for determining the spatial relation for uplink transmission of the terminal device may also be specifically indicated. Optionally, the foregoing methods may also be used to determine the reception beam of the PDSCH of the first cell. To be specific, the spatial relation for uplink transmission in the foregoing methods may be replaced with the reception beam for transmission of the PDSCH or the QCL information (for example, the QCL information of the typeD) for transmission of the PDSCH. Optionally, in another method, if a subcarrier spacing of the uplink transmission of the first cell is the same as a subcarrier spacing of the PDCCH corresponding to the uplink transmission, in the bandwidth part currently activated in the first cell, the reference signal resource used to indicate the quasi-co-location information of the PDCCH in the control-resource set with the minimum or maximum index in the one or more control-resource sets that are obtained by the terminal device through monitoring last time is used to determine the spatial relation for uplink transmission. Optionally, in another method, if the uplink transmission of the first cell is scheduled by using the second cell, and a subcarrier spacing of the uplink transmission of the first cell is different a subcarrier spacing of downlink transmission of the second cell, the TCI-state with the minimum or maximum index in the activated TCI-states that are used for transmission of the PDSCH in the first cell is used to determine the spatial relation for uplink transmission.

Embodiments of this application may be applied to single station (single transmission and reception point, single TRP)-based uplink transmission, or may be applied to a multi-station (multiple TRP) transmission scenario. The foregoing example is described based on a single station. When the uplink transmission is based on a multi-station, the foregoing method may be improved, so that the method can be applied to the multi-station transmission scenario. The following describes an example of a multi-station transmission scenario.

For example, in the foregoing solution e2, in the bandwidth part currently activated in the second cell, the reference signal resource corresponding to the currently activated TCI-state of the control-resource set with the minimum or maximum index in the one or more control-resource sets that are obtained by the terminal device through monitoring last time is used to determine the spatial relation for transmission of the PUCCH/PUSCH/SRS. The foregoing method may be further limited. To be specific, the reference signal resource corresponding to the currently activated TCI-state of the control-resource set with the minimum or maximum index in the control-resource sets that are associated with the PUCCH/PUSCH/SRS is used to determine the spatial relation for transmission of the PUCCH/PUSCH/SRS. For example, in the bandwidth part currently activated in the second cell, the reference signal resource corresponding to the currently activated TCI-state of the control-resource set with the minimum or maximum index in the one or more control-resource sets that are associated with the PUCCH/PUSCH/SRS and that are obtained by the terminal device through monitoring last time is used to determine the spatial relation for transmission of the PUCCH/PUSCH/SRS.

An association relationship between the PUCCH/PUSCH/SRS and the control-resource set may be directly associated. For example, one PUCCH/PUSCH/SRS may be associated with one CORESET (for example, associated with one CORESET index), or one CORESET may be associated with one PUCCH/PUSCH/SRS (for example, associated with one PUCCH resource index). The PUCCH/PUSCH/SRS and the control-resource set may be implemented by associating same other indexes. For example, each CORESET may be associated with a first index value, for example, CORESETPoolIndex. The first index value may be 0 or 1, where 0 and 1 separately corresponds to one TRP. The PUCCH/PUSCH/SRS may alternatively be associated with a second index, for example, PUCCH Resource-CORESETpoolIndex, and a value of the second index is 0 or 1. When the first index value associated with one CORESET is the same as the value of the second index associated with one PUCCH/PUSCH/SRS, it may be considered that the CORESET and the PUCCH/PUSCH/SRS are associated. The first index and the second index may be same indexes, or may be different indexes. In this embodiment of this application, "/" means "or". For example, "PUCCH/PUSCH/SRS" means "PUCCH, PUSCH, or SRS".

In another possible implementation, in multi-station transmission, the PDSCH may be transmitted by using two TCI-states. In this case, one value of the TCI field in the DCI corresponds to the two TCI-states. Therefore, the solution e3 may be further extended to indicate the multi-station transmission scenario. For example, a group of TCI-states corresponding to a minimum or maximum TCI field value may be selected from a plurality of groups of TCI-states (where each group includes two TCI-states) that are activated in the second cell for transmission of the PDSCH, to determine the transmission beam for the uplink transmission. Alternatively, when the PDCCH is sent by using a plurality of downlink beams, the reception beams corresponding to the transmission beams may be used as transmission beams for the uplink transmission.

In another method, if the first cell is a Pcell, a PScell, or a PUCCH-Scell in an MCG, the first cell uses a reception beam of a downlink control channel of the first cell as the transmission beam for the uplink transmission. In other words, in the first cell, for example, in the bandwidth part currently activated in the first cell, the reference signal resource (for example, the reference signal resource in the QCL-info of the typeD) corresponding to the currently activated TCI-state of the control-resource set with the minimum or maximum index in the one or more control-resource sets that are obtained through monitoring last time, namely, the reference signal resource used to indicate the quasi-co-location information (for example, the quasi-co-location information of the typeD type) of the PDCCH corresponding to the control-resource set is used to determine the spatial relation/transmission beam for the uplink transmission. That is, a spatial reception parameter/reception beam of the PDCCH corresponding to the control-resource set is used as a spatial transmission parameter/transmission beam for the uplink transmission in the first cell.

If a PUCCH-Scell in an SCG of the first cell is used, the PScell is used as the second cell. In the second cell, for example, in the bandwidth part currently activated in the second cell, the reference signal resource (for example, the reference signal resource in the QCL-info of the typeD) corresponding to the currently activated TCI-state of the control-resource set with the minimum or maximum index in the one or more control-resource sets that are obtained through monitoring last time, namely, the reference signal resource used to indicate the quasi-co-location information (for example, the quasi-co-location information of the typeD type) of the PDCCH corresponding to the control-resource set is used to determine the spatial relation/transmission beam for the uplink transmission. That is, a spatial reception parameter/reception beam of the PDCCH corresponding to the control-resource set is used as a spatial transmission parameter/transmission beam for the uplink transmission in the first cell.

Based on the foregoing content, the following content is further provided in this embodiment of this application to describe embodiments of this application.

The foregoing solution related to FIG. 2 is applicable to a single station scenario, or is applicable to a multi-station scenario. The single station scenario means that one TRP is used to transmit downlink data to the terminal device, and the terminal device transmits uplink data to the TRP. In the multi-station scenario, a plurality of TRPs transmit downlink data to the terminal device, and the terminal device may also transmit uplink data to the plurality of TRPs. The multi-station scenario mentioned in this embodiment of this application may be a multiple TRP transmission scenario based on a plurality of pieces of DCI. Specifically, the network device may transmit the PDSCH to a same terminal device by using the plurality of pieces of DCI in one transmission time unit (for example, in one slot). Each piece of DCI may correspond to one TRP, and schedule one PDSCH. In the R16 protocol, a concept of TRP does not directly appear. Therefore, in this embodiment of this application, a plurality of CORESET groups may be used to represent a transmission scenario of a plurality of TRPs. The control-resource set group in this embodiment of this application may also be written as a CORESET group.

In a possible implementation, when a plurality of CORESET groups are configured for the terminal device, each CORESET group in the plurality of CORESET groups includes one or more CORESETs. First index values of CORESETs included in one CORESET group are the same, and first index values of CORESETs from two different CORESET groups are different. In other words, the network device may configure a plurality of CORESETs for the terminal device, and each CORESET may be separately associated with one first index value (for example, CORESETPoolIndex). CORESETs associated with a same first index value may be considered as one CORESET group. For example, a plurality of CORESETs are configured, and the CORESETs are separately associated with one first index value, first index values associated with some CORESETs are 0, and first index values associated with some CORESETs are 1. Therefore, the configured CORESETs are divided into two groups. All first index values associated with CORESETs included in one CORESET group are 0, and all first index values associated with CORESETs included in the other CORESET group are 1.

In an optional implementation, when it is determined that all CORESETs configured by the network device for the terminal device are associated with two different first index values, that is, it may be determined that all CORESETs configured for the terminal device belong to two different CORESET groups, it may be determined that the terminal device is in a multi-station scenario, or it may be described as that a multiple TRP transmission mode based on a plurality of pieces of DCI may be used between the network device and the terminal device.

It should be understood that, in this embodiment of this application, determining the spatial relation for uplink transmission may be understood as determining the transmission beam for the uplink transmission. The beam in this embodiment of this application may be a "spatial setting" in the protocol.

In addition to the several solutions for determining the spatial relation for uplink transmission provided in the foregoing content, for step 201, in this embodiment of this application, several solutions for determining the spatial relation for uplink transmission are further described by using a solution i1, a solution i2, a solution i3, a solution i4, and a solution i5 below.

In the solution i1, the transmission beam configured by the network device for the uplink transmission is used as the transmission beam for performing uplink transmission in the first cell.

In the solution i2, the reception beam of the PDCCH for scheduling the uplink transmission is used as the transmission beam for performing uplink transmission in the first cell.

In the solution i3, the reception beam of the reference signal resource for road loss measurement for the uplink transmission is used as the transmission beam for performing uplink transmission in the first cell.

In the solution i4, the reception beam of the PDCCH corresponding to the CORESET with the minimum or maximum index in the CORESET group to which the PDCCH for scheduling uplink transmission belongs is used as the transmission beam for performing uplink transmission in the first cell.

In the solution i5, the reception beam of the PDCCH corresponding to the CORESET with the minimum or maximum index in the CORESET group that is associated with the uplink transmission and that is configured/obtained through monitoring last time is used as the transmission beam for performing uplink transmission in the first cell.

In an optional implementation, in the solution i5, one type of uplink transmission may be associated with one CORESET group, and this may specifically include the following three cases: 1. The uplink transmission is associated with one CORESET, the CORESET belongs to one CORESET group, and the CORESET group is a CORESET group associated with the uplink transmission. 2. The uplink transmission is associated with one second index value, and one CORESET group is associated with one first index value, and when the first index value is the same as the second index value, it indicates that the uplink transmission is associated with the CORESET group. 3. The uplink transmission is associated with one first index value, one CORESET group is also associated with one first index value, and the uplink transmission and the CORESET group have an association relationship, where the first index value associated with the uplink transmission is the same as that associated with the CORESET group.

The solution i1, the solution i2, and the solution i3 are applicable to a single station scenario or a multi-station scenario. The solutions i4 and i5 are applicable to a multi-station scenario.

The solution i2, the solution i3, the solution i4, and the solution i5 may also be described as using the first beam as the transmission beam for performing uplink transmission in the first cell. The first beam may have a plurality of selection solutions, for example, the beam that may be used as the transmission beam for the uplink transmission and that is mentioned in the solution i2, the solution i3, the solution i4, and the solution i5.

In step 201, when a plurality of control-resource set groups are configured for the terminal device, one solution may be selected from the solution i1, the solution i2, the solution i3, the solution i4, and the solution i5 for performing uplink transmission.

In another optional implementation, for each of the foregoing methods for determining the spatial relation for uplink transmission (for example, the solution i1 or the solution i2), RRC signaling may be used for configuration. For example, a parameter in one piece of RRC signaling may be used to enable a solution for determining the spatial relation for uplink transmission. Alternatively, a parameter in one piece of RRC signaling is used to indicate that one of the plurality of solutions for determining the spatial relation for uplink transmission is selected.

In a third optional implementation, for each of the foregoing methods for determining the spatial relation for uplink transmission (for example, the solution i1 or the solution i2), whether the method is supported may be reported by using a terminal device capability reporting process. Optionally, the terminal device capability reporting process may be used to report which one of the plurality of methods is specifically supported by the terminal device.

In a fourth optional implementation, a condition may be set for the method for determining the spatial relation for uplink transmission (for example, the solution i1 or the solution i2). The following describes the condition by using a solution j1 and a solution j2.

In the solution j1, when a plurality of control-resource set groups are configured, the transmission beam for the uplink transmission that is configured by the network device is used as the transmission beam for performing uplink transmission in the first cell.

A manner for implementing the solution j1 may be as follows: If the plurality of control-resource set groups are configured for the terminal device, and the network device configures the transmission beam for the uplink transmission, the transmission beam for the uplink transmission that is configured by the network device is used as the transmission beam for performing uplink transmission in the first cell. It may be understood that when the plurality of control-resource set groups are configured for the terminal device, if the network device configures the transmission beam for the uplink transmission, the transmission beam for the uplink transmission that is configured by the network device needs to be used as the transmission beam for performing uplink transmission in the first cell.

Another manner of implementing the solution j1 may be as follows: If the plurality of control-resource set groups are configured for the terminal device, only the transmission beam for the uplink transmission that is configured by the network device can be used as the transmission beam for performing uplink transmission in the first cell. It may be understood that, when the plurality of control-resource set groups are configured for the terminal device, no matter whether the network device configures the transmission beam for the uplink transmission, the terminal device can use only the transmission beam for the uplink transmission that is configured by the network device as the transmission beam for performing uplink transmission in the first cell, and cannot have another option (for example, cannot use the first beam as the transmission beam for the uplink transmission).

Alternatively, there may be another implementation. If the plurality of control-resource set groups are configured for the terminal device, the network device needs to configure the transmission beam for the uplink transmission for the terminal device. In this embodiment of this application, the spatial relation for uplink transmission that is configured by the network device may also be understood as the spatial relation for uplink transmission that is indicated by the network device.

The solution j1 is used as an example. If all CORESETs (for example, CORESETs configured in PDCCH-Config) configured by the network device for the terminal device are associated with two different first index values (for example, CORESETPoolIndex), that the PUSCH of the terminal device can be scheduled only by using DCI whose type is format 0_1 (where the format 0_1 indicates an uplink transmission beam) is limited, or that the PUSCH of the terminal device cannot be scheduled by using DCI whose type is format 0_0 (where the format 0_0 does not indicate an uplink transmission beam) is limited, or that the network device needs to indicate an SRS resource/spatial relation for uplink transmission to the terminal device is limited. Further, in an optional implementation, for a same PUCCH, PUSCH, or SRS, that a reference resource for road loss measurement, for uplink transmission, that is configured by the network device for the terminal device and a reference resource in a configured spatial relation for uplink transmission are the same may be further limited. In this case, the terminal device needs to select the reference resource in the spatial relation for uplink transmission that is configured by the network device for the terminal device as the reference resource for road loss measurement for the uplink transmission.

The solution j1 is merely an example after the solution i1 is added with an implementation condition. Optionally, an implementation condition may also be added to the solutions i2 to i5. For example, regardless of whether the network device configures the spatial relation for uplink transmission, one of the solutions i2 to i5 needs to be used to determine the spatial relation for uplink transmission of the terminal device. The following solution j2 also illustrates an example of determining the spatial relation for uplink transmission.

In the solution j2, when a plurality of control-resource set groups are configured, and if one or more of the following conditions are met, the first beam may be used as the transmission beam for the uplink transmission, to perform uplink transmission in the first cell:
 The network device does not configure the transmission beam for the uplink transmission for the terminal device;
  the network device does not configure the reference signal resource for road loss measurement for the uplink transmission for the terminal device;
  the network device indicates that the terminal device may use another transmission beam or another reception beam as the transmission beam for the uplink transmission, for example, configure a parameter enableDefaultBeamPlForPUSCH0_0/ enableDeault-BeamPlForPUCCH/enableDefaultBeamPlForSRS; and
  the terminal device has a beam correspondence, for example, the terminal device reports a terminal capability parameter (for example, beamCorrespondence-WithoutUL-BeamSweeping) to reflect that the terminal device has the beam correspondence.

In the solution j2, it may also be described as: When the plurality of control-resource set groups are configured, and if one or more of the following conditions are met, one of the solution i2, the solution i3, the solution i4, and the solution i5 may be used to determine the spatial relation for uplink transmission.

In the solution j2, in an optional implementation, when the plurality of control-resource set groups are configured, and if one or more of the conditions mentioned in the solution j2 are met, the first beam needs to be used as the transmission beam for the uplink transmission, to perform uplink transmission in the first cell.

Before step 202, in this embodiment of this application, the method further includes: determining the reference signal resource for road loss measurement. In this embodiment of this application, several solutions for determining the reference signal resource for road loss measurement are provided. For details, refer to a solution k1, a solution k2, a solution k3, a solution k4, and a solution k5 below.

In the solution k1, the reference signal resource for road loss measurement that is configured by the network device for the uplink transmission is used as the reference signal resource for road loss measurement for performing uplink transmission in the first cell.

In the solution k2, the QCL reference signal resource of the typeD type in the TCI-state of the PDCCH for scheduling the uplink transmission is used as the reference signal resource for road loss measurement for performing uplink transmission in the first cell.

In the solution k3, the QCL (where a type of QCL-info is a typeA, a typeB, a typeC, or a typeD) reference signal resource of the typeD type in the TCI-state of the CORESET with the minimum or maximum index in the CORESET group to which the PDCCH for scheduling the uplink transmission belongs is used as the reference signal resource for road loss measurement for performing uplink transmission in the first cell.

In the solution k4, the QCL (where a type of QCL-info is a typeA, a typeB, a type, or a typeD) reference signal resource of the typeD type in the TCI-state of the PDCCH corresponding to the CORESET (for example, may be the CORESET with the minimum or maximum index in the CORESETs that belong to the CORESET group and that are obtained through monitoring last time or obtained through monitoring in the last slot) with the minimum or maximum index in the CORESET group associated with the uplink transmission is used as the reference signal resource for road loss measurement for performing uplink transmission in the first cell.

In the solution k5, the reference signal resource in the spatial relation for uplink transmission is used as the reference signal resource for road loss measurement for performing uplink transmission in the first cell.

In the solution k6, one reference signal resource for road loss measurement in a set of reference signal resources for road loss measurement that corresponds to the uplink transmission is used as the reference signal resource for road loss measurement for performing uplink transmission in the first cell.

In the solution k6, the set of reference signal resources for road loss measurement that corresponds to the uplink transmission includes one or more of the following:
  a set of configured reference signal resources for road loss measurement;

reference signal resources of K control-resource sets with minimum or maximum indexes in the configured CORESETs, where the indexes in the CORESETs may be the first index values or the second indexes in the CORESETs;

reference signal resources of K control-resource sets with minimum or maximum indexes in the configured CORESET group associated with the uplink transmission;

reference signal resources in K TCI-states in the TCI-states that are used for transmission of the physical downlink shared channel in the currently activated bandwidth part; and reference signal resources in K TCI-states with minimum or maximum indexes in the TCI-states that are used for transmission of the physical downlink shared channel in the currently activated bandwidth part.

The CORESET, configured by the terminal device, mentioned in this embodiment of this application may be a CORESET of the first cell, or may be a CORESET of another cell. The another cell may be a Pcell, a PScell, a PUCCH-Scell (for example, a PUCCH-Scell in an MCG, or a PUCCH-Scell in an SCG), or a scheduling cell of the current cell. The value of K may be indicated by using RRC/MAC CE/DCI signaling, or may be reported by using a UE capability reporting process. If K is configured by using RRC, K may be a mandatory parameter or an optional parameter. An upper limit value of K may be any one of 1 to 64. A possible value of K may be {1, 2, 3, 4, 5, 6, 7, 8, 12, 16, 32, 64} or a subset thereof. If K is not configured, a default value is used, and the default value may be any one of 1 to 64.

The solution k1, the solution k2, and the solution k5 are applicable to a single station scenario or a multi-station scenario. The solution k3, the solution k4, and the solution k6 are applicable to a multi-station scenario.

The solution k2, the solution k3, the solution k4, and the solution k5 may also be described as using a third resource as the reference signal resource for road loss measurement for performing uplink transmission in the first cell. The third resource may have a plurality of selection solutions, for example, a resource that may be used as the reference signal resource for road loss measurement for the uplink transmission and that is mentioned in the solution k2, the solution k3, the solution k4, the solution k5, and the solution k6.

In step 201, when the plurality of control-resource set groups are configured for the terminal device, one solution may be selected from the solution k1, the solution k2, the solution k3, the solution k4, the solution k5, and the solution k6, to determine the reference signal resource for road loss measurement.

In another optional implementation, for each of the foregoing methods for determining the reference signal resource for road loss measurement (for example, the solution k1 or the solution k2), the RRC may be used for configuration. For example, a parameter in one piece of RRC signaling may be used to enable one solution for determining the reference signal resource for road loss measurement. Alternatively, a parameter in one piece of RRC signaling is used to indicate that one of the plurality of solutions for determining the reference signal resource for road loss measurement is selected.

In a third optional implementation, for each of the foregoing methods for determining the reference signal resource for road loss measurement (for example, the solution k1 or the solution k2), one or more methods for determining the reference signal resource for road loss measurement that are supported by the terminal device may be reported by using a terminal device capability reporting process. Optionally, one method for determining the reference signal resource for road loss measurement that is selected by the terminal device may be reported by using a terminal device capability reporting process.

In a fourth optional implementation, a condition may be set for the method for determining the reference signal resource for road loss measurement (for example, the solution k1 or the solution k2). The following provides an example for description by using a solution l1 and a solution l2.

In the solution l1, when a plurality of control-resource set groups are configured, the reference signal resource for road loss measurement that is configured by the network device for the uplink transmission is used as the reference signal resource for road loss measurement for performing uplink transmission in the first cell.

A manner of implementing the solution l1 may be as follows: If the plurality of control-resource set groups are configured for the terminal device, and the network device configures the reference signal resource for road loss measurement for the uplink transmission, the reference signal resource for road loss measurement that is configured by the network device for the uplink transmission is used as the reference signal resource for road loss measurement for performing uplink transmission in the first cell. It may be understood that, when the plurality of control-resource set groups are configured for the terminal device, if the network device configures the reference signal resource for road loss measurement for the uplink transmission, the reference signal resource for road loss measurement that is configured by the network device for the uplink transmission needs to be used as the reference signal resource for road loss measurement for performing uplink transmission in the first cell.

Another manner of implementing the solution l1 may be as follows: If the plurality of control-resource set groups are configured for the terminal device, only the reference signal resource for road loss measurement that is configured by the network device for the uplink transmission can be used as the reference signal resource for road loss measurement for performing uplink transmission in the first cell. It may be understood that, when the plurality of control-resource set groups are configured for the terminal device, no matter whether the network device configures the reference signal resource for road loss measurement for the uplink transmission, the terminal device can use only the reference signal resource for road loss measurement that is configured by the network device for the uplink transmission as the reference signal resource for road loss measurement for performing uplink transmission in the first cell, and cannot have another option (for example, cannot use another signal resource as the reference signal resource for road loss measurement for the uplink transmission).

Alternatively, there may be other descriptions. If the plurality of control-resource set groups are configured for the terminal device, the network device needs to configure the reference signal resource for road loss measurement for the uplink transmission of the terminal device. In this embodiment of this application, the reference signal resource for road loss measurement that is configured by the network device for the uplink transmission may also be understood as the reference signal resource for road loss measurement that is indicated by the network device for the uplink transmission.

The solution 11 is merely an example after the solution k1 is added with an implementation condition. Optionally, the implementation condition may also be added to the solutions k2 to k6, for example, an example shown in the following solution 12.

In the solution 12, when a plurality of control-resource set groups are configured, and if one or more of the following conditions are met, the third resource may be used as the reference signal resource for road loss measurement for the uplink transmission:

The network device does not configure the reference signal resource for road loss measurement for the uplink transmission for the terminal device;
- the network device does not configure the reference signal resource for road loss measurement for the uplink transmission for the terminal device;
- the network device indicates the terminal device to use another reference signal resource for road loss measurement or another reception beam as the reference signal resource for road loss measurement for the uplink transmission, for example, configure a parameter enablePLRSupdateForPUSCHSRS; and
- the terminal device has a beam correspondence, for example, UE reports that the UE has a beam correspondence by using a terminal capability parameter (for example, beamCorrespondenceWithoutUL-Beam-Sweeping).

In the solution 12, it may also be described as: When the plurality of control-resource set groups are configured, and if one or more of the following conditions are met, one of the solution k2, the solution k3, the solution k4, the solution k5, and the solution k6 may be used to determine the reference signal resource for road loss measurement.

In the solution 12, in an optional implementation, when the plurality of control-resource set groups are configured, and if one or more of the conditions mentioned in the solution 12 are met, the first beam needs to be used as the reference signal resource for road loss measurement for the uplink transmission, to perform uplink transmission in the first cell.

The PDCCH corresponding to the uplink transmission mentioned in this embodiment of this application may specifically refer to the PDCCH scheduling the uplink transmission, for example, a PDCCH scheduling a PUCCH, a PUSCH, or an SRS. For example, the PUCCH or the PUSCH carries a decoding result (HARQ-ACK) of the PDSCH, and the corresponding PDCCH refers to the PDCCH scheduling the PDSCH. Alternatively, the PUCCH/PUSCH carries an aperiodic CSI measurement result, and the corresponding PDCCH refers to the PDCCH triggering aperiodic measurement.

The uplink transmission mentioned in this embodiment of this application may be grant-based uplink transmission, namely, uplink transmission performed based on an UL-grant indicated by DCI. Alternatively, the uplink transmission may be configured-grant or grant-free uplink transmission, namely, uplink transmission that is configured in advance, or uplink transmission that indicates a plurality of times of transmission at a time.

The solution provided in this embodiment of this application may be applied to all types of PUCCHs, or may be applied to only some types of PUCCHs, for example, one or more of the following: a PUCCH that carries a data decoding result (HARQ-ACK), a PUCCH that carries a scheduling request (SR), a PUCCH that carries a CSI measurement result, a PUCCH format 0, a PUCCH format 1, a PUCCH format 2, a PUCCH format 3, a PUCCH format 4, a PUCCH format 6, and a PUCCH format 7. The solution provided in this embodiment of this application may be applied to all types of SRSs, or may be applied to only some types of SRSs, for example, one or more of the following: an SRS whose usage is beam management, an SRS whose usage is a codebook, an SRS whose usage is a non-codebook, and an SRS whose usage is antenna switching. The solution provided in this embodiment of this application may be applied to all types of PUSCHs, or may be applied to only some types of PUSCHs, for example, one or more of the following: a PUSCH that carries a data decoding result (HARQ-ACK), a PUSCH that carries a CSI measurement result, and a PUSCH that carries uplink data (for example, uplink data other than the HARQ-ACK and the CSI measurement result).

Figure 3:
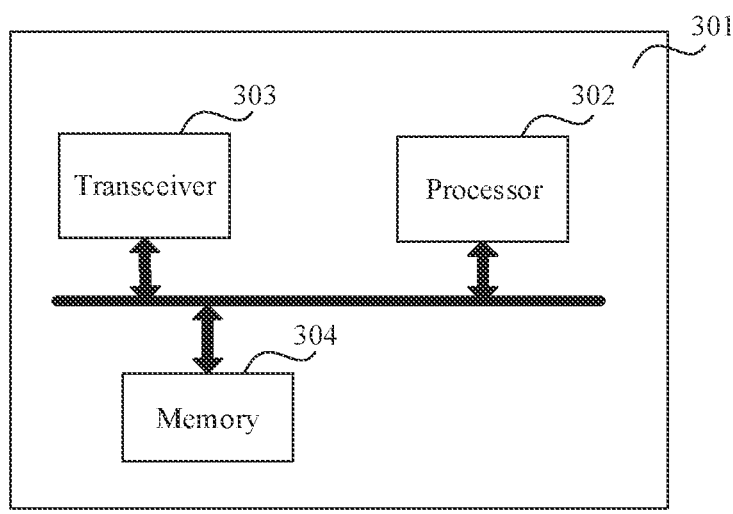
FIG. 3 is a schematic diagram of a structure of a communication device according to an embodiment of this application.

Based on the foregoing method, FIG. 3 is a schematic diagram of a structure of a communication device according to an embodiment of this application. As shown in FIG. 3, the communication device may be a terminal device or a network device, or may be a chip or a circuit, such as a chip or a circuit that can be disposed in the terminal device, or a chip or a circuit that can be disposed in the network device.

Further, the communication device 301 may further include a bus system. A processor 302, a memory 304, and a transceiver 303 may be connected through the bus system.

It should be understood that the processor 302 may be a chip. For example, the processor 302 may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods may be implemented by using a hardware integrated logical circuit in the processor 302 or by using instructions in a form of software. The steps of the methods disclosed with reference to embodiments of this application may be directly performed and completed by a hardware processor, or may be performed and completed by using a combination of hardware and software modules in the processor 302. The software module may be located in a mature storage medium in the art, such as a random access memory, a flash memory, a read-only memory, a programmable read-only memory, an electrically erasable programmable memory, or a register. The storage medium is located in the memory 304. The processor 302 reads information in the memory 304, and completes the steps of the foregoing method in combination with hardware of the processor 302.

It should be noted that, the processor 302 in this embodiment of this application may be an integrated circuit chip, and has a signal processing capability. In an implementation process, steps in the foregoing method embodiments may be implemented by using a hardware integrated logical circuit in the processor or by using instructions in a form of software. The foregoing processor may be a general-purpose processor, a DSP, an ASIC, a FPGA or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory 304 in this embodiment of this application may be a volatile memory or a nonvolatile memory, or may include both the volatile memory and the nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. For example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM). It should be noted that the memory in the system and the method described in this specification is intended to include, but not limited to, these memories and any memory of another proper type.

When the communication device 301 corresponds to the terminal device in the foregoing method, the communication device may include the processor 302, the transceiver 303, and the memory 304. The memory 304 is configured to store instructions, and the processor 302 is configured to execute the instructions stored in the memory 304, to implement a related solution of the terminal device in any one or more corresponding methods shown in FIG. 2.

When the communication device 301 is the foregoing terminal device, the processor 302 is configured to: determine a spatial relation for uplink transmission of a first cell by using a first resource in a second cell; and perform uplink transmission in the first cell through the transceiver 303 based on the spatial relation for uplink transmission of the first cell.

In an optional implementation, the processor 302 is specifically configured to perform one of the following: when the spatial relation for uplink transmission is not configured in the first cell, determining the spatial relation for uplink transmission of the first cell by using the first resource in the second cell; when the spatial relation for uplink transmission is not configured in the first cell, no CORESET is configured in the first cell, and no TCI-state that is used for transmission of a PDSCH is activated in a downlink bandwidth part currently activated in the first cell, determining the spatial relation for uplink transmission of the first cell by using the first resource in the second cell; and when the spatial relation for uplink transmission and a reference signal resource for road loss measurement are not configured in the first cell, no CORESET is configured in the first cell, and no TCI-state that is used for transmission of a PDSCH is activated in the first cell, determining the spatial relation for uplink transmission of the first cell by using the first resource in the second cell.

In an optional implementation, when the communication device 301 is the terminal device or a chip or a circuit disposed in the terminal device, the processor 302 is configured to: when a plurality of control-resource set groups are configured, perform uplink transmission in the first cell through the transceiver unit by using a transmission beam configured by the network device for the uplink transmission as a transmission beam for the uplink transmission. Alternatively, when the communication device 301 is the terminal device, the processor 302 is configured to: when a plurality of control-resource set groups are configured, perform uplink transmission in the first cell through the transceiver unit by using a first beam as a transmission beam for the uplink transmission.

In an optional implementation, when the communication device 301 is the terminal device or a chip or a circuit disposed in the terminal device, the processor 302 is configured to: when a plurality of control-resource set groups are configured, if the network device configures a transmission beam for the uplink transmission, perform uplink transmission in the first cell through the transceiver unit by using a transmission beam configured by the network device for the uplink transmission as a transmission beam for the uplink transmission.

In an optional implementation, when the communication device 301 is the terminal device or a chip or a circuit disposed in the terminal device, the processor 302 is configured to: when a plurality of control-resource set groups are configured, perform uplink transmission in the first cell through the transceiver unit by using a first beam as a transmission beam for the uplink transmission if one or more of the following conditions are met: The network device does not configure the transmission beam for the uplink transmission; the network device does not configure a reference signal resource for road loss measurement for the uplink transmission; the network device indicates that the terminal device may use another transmission beam or another reception beam as the transmission beam for the uplink transmission; and the terminal device has a beam correspondence.

In an optional implementation, when the communication device 301 is the terminal device or a chip or a circuit disposed in the terminal device, the processor 302 is further configured to: perform road loss measurement by using a reference signal resource for road loss measurement that is configured by the network device for the uplink transmission as a reference signal resource for road loss measurement for the uplink transmission; or perform road loss measurement by using a third resource as a reference signal resource for road loss measurement for the uplink transmission.

In an optional implementation, when the communication device 301 is the terminal device or a chip or a circuit disposed in the terminal device, the processor 302 is further configured to: when a plurality of control-resource set groups are configured, when the network device configures a reference signal resource for road loss measurement for the uplink transmission, the reference signal resource for road loss measurement that is configured by the network device for the uplink transmission is used as a reference signal resource for road loss measurement for the uplink transmission.

In an optional implementation, when the communication device 301 is the terminal device or a chip or a circuit disposed in the terminal device, the processor 302 is configured to: when a plurality of control-resource set groups are configured, use a third resource as a reference signal resource for road loss measurement for the uplink transmission when one or more of the following conditions are met: The network device does not configure a transmission beam for the uplink transmission; the network device does not configure the reference signal resource for road loss measurement for the uplink transmission; the network device indicates that the terminal device may use another transmission beam or another reception beam as the transmission beam for uplink transmission; and the terminal device has a beam correspondence.

For content such as selection of the second cell, and selection of the first resource, refer to the foregoing content. Details are not described herein again.

In an optional implementation, when the communication device 301 is the network device or a chip or a circuit disposed in the network device, the processor 302 is configured to: when a spatial relation used to enable the terminal device to perform uplink transmission in the first cell is updated, and a second condition is met, deliver, to the terminal device through the transceiver 303, the spatial relation used to enable the terminal device to perform uplink transmission in the first cell.

In an optional implementation, when the communication device 301 is the network device or a chip or circuit disposed in the network device, the processor 302 is configured to: when a plurality of control-resource set groups are configured for the terminal device, configure a transmission beam for the uplink transmission of the terminal device; and/or when a plurality of control-resource set groups are configured for the terminal device, configure a reference signal resource for road loss measurement for the uplink transmission of the terminal device.

For another related solution on the network device side, refer to the foregoing content. Details are not described herein again.

For concepts, explanations, detailed descriptions, and other steps of the communication device that are related to the technical solutions provided in embodiments of this application, refer to the descriptions of the content in the foregoing method embodiments or other embodiments. Details are not described herein again.

Figure 4:
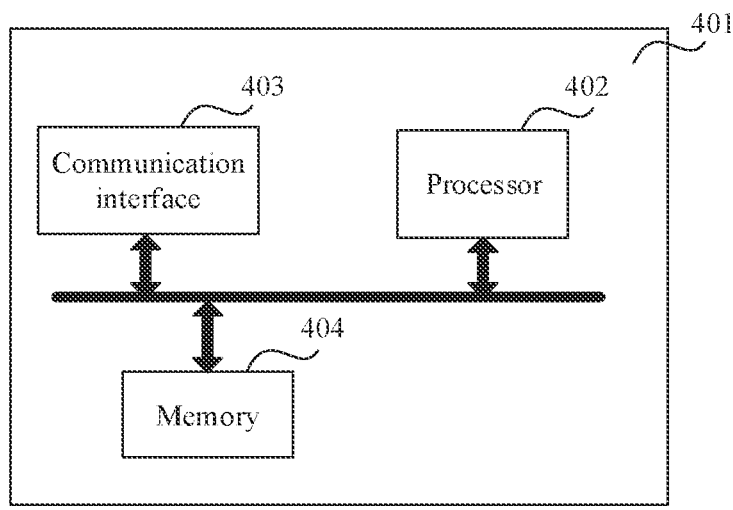
FIG. 4 is a schematic diagram of a structure of another communication device according to an embodiment of this application.

According to the foregoing method, FIG. 4 is a schematic diagram of a structure of a communication device according to an embodiment of this application. As shown in FIG. 4, the communication device 401 may include a memory 404, a processor 402, and a communication interface 403. The memory 404 is configured to input and/or output information. The processor 402 is configured to execute a computer program or instructions, to enable the communication device 401 to implement the method on the terminal device side in the related solution in FIG. 2, or enable the communication device 401 to implement the method on the network device side in the related solution in FIG. 2. In this embodiment of this application, the communication interface 403 may implement the solution implemented by the transceiver 303 in FIG. 3, and the processor 402 may implement the solution implemented by the processor 302 in FIG. 3. Details are not described herein again.

Figure 5:
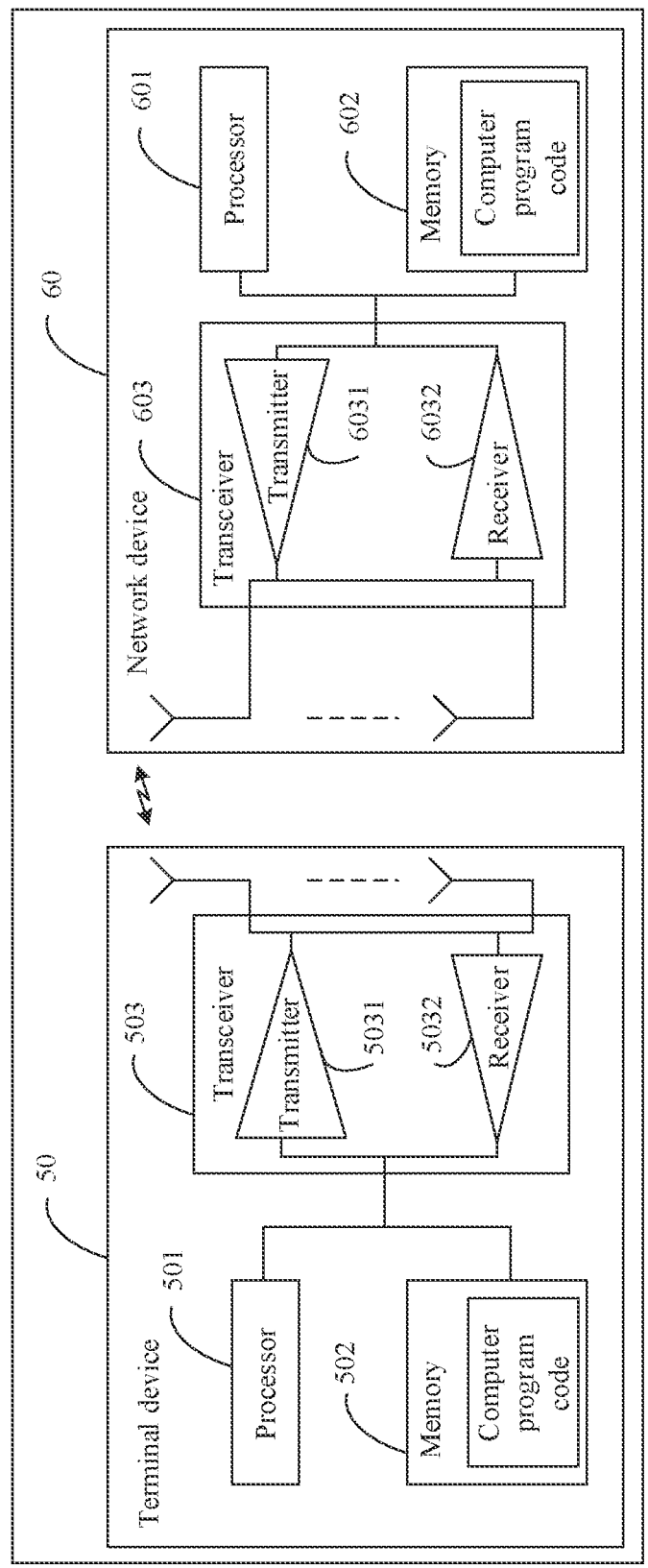
FIG. 5 is a schematic diagram of a structure of a communication system according to an embodiment of this application.

According to the method provided in embodiments of this application, an embodiment of this application further provides a communication system, including the foregoing network device and one or more terminal devices. FIG. 5 shows an example of a schematic diagram a structure of a communication system. As shown in FIG. 5, the communication system includes a terminal device 50 and a network device 60. As shown in FIG. 5, the terminal device 50 may include a memory 502, a processor 501, and a transceiver 503. The transceiver 503 may include a transmitter 5031 and a receiver 5032. The receiver 5032 may be configured to receive transmission control information through an antenna, and the transmitter 5031 may be configured to send transmission feedback information to the network device 60 through the antenna.

As shown in FIG. 5, the network device 60 may include a memory 602, a processor 601, and a transceiver 603. The transceiver 603 may include a transmitter 6031 and a receiver 6032. The transmitter 6031 may be configured to send transmission control information to the terminal device 50 through an antenna, and the receiver 6032 may be configured to receive, through the antenna, transmission feedback information sent by the terminal device 50.

In this embodiment of this application, the transceiver 503 may implement the solution, on the terminal device side, that is implemented by the transceiver 303 in FIG. 3 or the communication interface 403 in FIG. 4, and the processor 501 may implement the solution, on the terminal device side, that is implemented by the processor 302 in FIG. 3 or FIG. 4. Details are not described herein again. In this embodiment of this application, the transceiver 603 may implement the solution, on the network device side, that is implemented by the transceiver 303 in FIG. 3 or the communication interface 403 in FIG. 4, and the processor 601 may implement the solution, on the network device side, that is implemented by the processor 302 in FIG. 3 or FIG. 4. Details are not described herein again.

Figure 6:
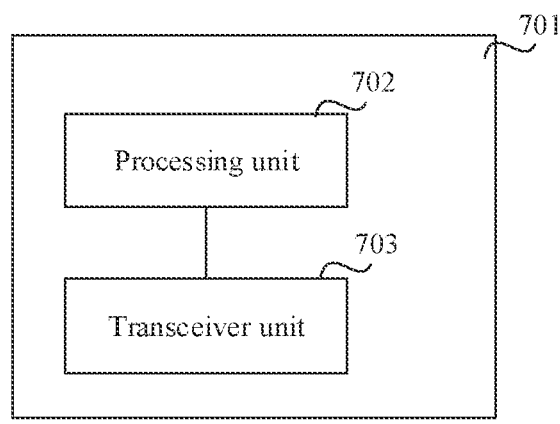
FIG. 6 is a schematic diagram of a structure of another communication device according to an embodiment of this application.

Based on the foregoing embodiments and a same concept, FIG. 6 is a schematic diagram of a communication device according to an embodiment of this application. As shown in FIG. 6, the communication device 701 may be a terminal device or a network device, or may be a chip or a circuit, such as a chip or a circuit that can be disposed in the terminal device or the network device.

The communication device may correspond to the terminal device in the foregoing method. The communication device may implement steps performed by the terminal device in any one or more corresponding methods shown in FIG. 2. The communication device may include a processing unit 702 and a transceiver unit 703.

In an optional implementation, when the communication device 701 is the terminal device, the processing unit 702 is configured to: determine a spatial relation for uplink transmission of a first cell by using a first resource in a second cell; and perform uplink transmission in the first cell through the transceiver unit 703 based on the spatial relation for uplink transmission of the first cell.

In an optional implementation, when the communication device 301 is the terminal device, the processing unit 702 is configured to: when a plurality of control-resource set groups are configured, perform uplink transmission in the first cell through the transceiver unit by using a transmission beam configured by the network device for the uplink transmission as a transmission beam for the uplink transmission. Alternatively, when the communication device 701 is the terminal device, the processing unit 702 is configured to: when a plurality of control-resource set groups are configured, perform uplink transmission in the first cell through the transceiver unit by using a first beam as a transmission beam for the uplink transmission.

In an optional implementation, when the communication device 701 is the network device, the processing unit 702 is configured to: when a spatial relation used to enable the terminal device to perform uplink transmission in the first cell is updated, and a second condition is met, deliver, to the terminal device through the transceiver unit 703, the spatial relation used to enable the terminal device to perform uplink transmission in the first cell.

In an optional implementation, when the communication device 301 is the network device, the processing unit 702 is configured to: when a plurality of control-resource set groups are configured for the terminal device, configure a transmission beam for the uplink transmission of the terminal device; and/or when a plurality of control-resource set groups are configured for the terminal device, configure a reference signal resource for road loss measurement for the uplink transmission of the terminal device.

For another related solution on the network device side, refer to the foregoing content. Details are not described herein again.

For concepts, explanations, detailed descriptions, and other steps of the communication device that are related to the technical solutions provided in embodiments of this application, refer to the descriptions of the content in the foregoing method embodiments or other embodiments. Details are not described herein again.

It may be understood that, for functions of the units in the communication device 701, refer to implementations of corresponding method embodiments. Details are not described herein again.

It should be understood that division into the foregoing units of the communication device is merely logical function division. In an actual implementation, all or a part of the units may be integrated into one physical entity, or may be physically separated. In this embodiment of this application, the transceiver unit 703 may be implemented by the transceiver 303 in FIG. 3, and the processing unit 702 may be implemented by the processor 302 in FIG. 3.

According to the methods provided in embodiments of this application, this application further provides a computer program product. The computer program product includes computer program code. When the computer program code is run on a computer, the computer is enabled to perform the method according to any one of the embodiments shown in FIG. 2.

According to the methods provided in embodiments of this application, this application further provides a computer-readable storage medium. The computer-readable medium stores program code. When the program code is run on a computer, the computer is enabled to perform the method according to any one of the embodiments shown in FIG. 2.

According to the methods provided in embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a special-purpose computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing device embodiments correspond to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, a distributed system, and/or across a network such as the internet interacting with other systems by using the signal).

A person of ordinary skill in the art may be aware that, various illustrative logical blocks and steps that are described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, device, and unit, refer to a corresponding process in the foregoing method embodiments. Details are not described herein again.

In the several embodiments provided in this application, it should be understood that, the disclosed system, device, and method may be implemented in other manners. For example, the described device embodiment is merely an example. For example, division into the units is merely logical function division. In an actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. All or a part of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a spatial relation for uplink transmission, comprising:
   determining a spatial relation for uplink transmission of a first cell by using a first resource in a second cell, wherein the determining a spatial relation for uplink transmission of a first cell by using a first resource in a second cell comprises one of the following:
      when the spatial relation for uplink transmission is not configured in the first cell, determining the spatial relation for uplink transmission of the first cell by using the first resource in the second cell;
      when the spatial relation for uplink transmission is not configured in the first cell, no CORESET is configured in the first cell, and no TCI-state that is used for transmission of a PDSCH is activated in a downlink bandwidth part currently activated in the first cell, determining the spatial relation for uplink transmission of the first cell by using the first resource in the second cell; or
      when the spatial relation for uplink transmission and a reference signal resource for road loss measurement are not configured in the first cell, no control-resource set is configured in the first cell, and no TCI-state that is used for transmission of the PDSCH is activated in the first cell, determining the spatial relation for uplink transmission of the first cell by using the first resource in the second cell; and
   performing uplink transmission in the first cell based on the spatial relation for uplink transmission of the first cell.

2. The method according to claim 1, wherein the second cell comprises one of the following:
   a primary cell corresponding to the first cell;
   a scheduling cell of the first cell; or
   a cell in cells that meet a first condition.

3. The method according to claim 1, wherein the second cell comprises one of the following:
   a primary cell corresponding to the first cell, wherein a frequency of the primary cell corresponding to the first cell belongs to a frequency range 2;
   a scheduling cell of the first cell, wherein a frequency of the scheduling cell of the first cell belongs to the frequency range 2; or
   a cell in cells that meet a first condition, wherein at least one of the frequency of the primary cell corresponding to the first cell or the frequency of the scheduling cell of the first cell belongs to the frequency range 1.

4. The method according to claim 2, wherein the cells that meet the first condition comprise one of the following:
   a cell in a cell group to which the first cell belongs;
   in the cell group to which the first cell belongs, a cell that is configured with a control-resource set;
   in the cell group to which the first cell belongs, a cell that uses a frequency range 2;
   in the cell group to which the first cell belongs, a cell that is configured with the control-resource set and uses the frequency range 2;
   a cell in a frequency band to which the first cell belongs;
   in the frequency band to which the first cell belongs, a cell that is configured with a control-resource set;
   in the frequency band to which the first cell belongs, a cell that uses the frequency range 2;
   in the frequency band to which the first cell belongs, a cell that is configured with the control-resource set and uses the frequency range 2;
   a cell in a frequency band list to which the first cell belongs;
   in the frequency band list to which the first cell belongs, a cell that is configured with a control-resource set;
   in the frequency band list to which the first cell belongs, a cell that uses the frequency range 2; or
   in the frequency band list to which the first cell belongs, a cell that is configured with the control-resource set and uses the frequency range 2.

5. The method according to claim 2, wherein the second cell comprises one of the following:
   in the cells that meet the first condition, a cell with a minimum or maximum index; or
   in the cells that meet the first condition, a cell whose frequency is the closest to a frequency of the first cell, wherein:
      if in the cells that meet the first condition, there are a plurality of cells whose frequencies are the closest to the frequency of the first cell, the second cell comprises the cell with the minimum or maximum index in the cells that meet the first condition and whose frequencies are the closest to the frequency of the first cell.

6. The method according to claim 1, wherein the first resource in the second cell comprises one of the following:
in a bandwidth part currently activated in the second cell, a reference signal resource that is used to indicate quasi-co-location information of a physical downlink control channel and that is in a control-resource set with a minimum index in one or more control-resource sets that are obtained through monitoring last time;
in the bandwidth part currently activated in the second cell, a reference signal resource in a transmission configuration indication state (TCI-state) with a minimum index in TCI-states that are used for transmission of a physical downlink shared channel (PDSCH);
when an initial access process is performed in the second cell, a resource in a used synchronization signal and broadcast channel measurement resource block (SSB);
a resource in a spatial relation for uplink transmission of the second cell; or
a reference signal resource for road loss measurement of the second cell.

7. The method according to claim 1, wherein the uplink transmission comprises one of the following:
uplink transmission of a physical uplink control channel (PUCCH);
uplink transmission of a physical uplink shared channel (PUSCH); or
uplink transmission of a sounding reference signal (SRS).

8. The method according to claim 1, wherein a spatial domain reception filter of the first resource comprises a spatial domain transmission filter for the uplink transmission.

9. An electronic device, comprising:
at least one processor; and
one or more memories coupled to the at least one processor and storing programming instructions for execution by the at least one processor to:
determine a spatial relation for uplink transmission of a first cell by using a first resource in a second cell, wherein the second cell is selected based on that a frequency of the second cell meets a predetermined condition, wherein determining the spatial relation for uplink transmission of the first cell by using the first resource in the second cell comprises one of the following:
when the spatial relation for uplink transmission is not configured in the first cell, determining the spatial relation for uplink transmission of the first cell by using the first resource in the second cell;
when the spatial relation for uplink transmission is not configured in the first cell, no CORESET is configured in the first cell, and no TCI-state that is used for transmission of a PDSCH is activated in a downlink bandwidth part currently activated in the first cell, determining the spatial relation for uplink transmission of the first cell by using the first resource in the second cell; or
when the spatial relation for uplink transmission and a reference signal resource for road loss measurement are not configured in the first cell, no control-resource set is configured in the first cell, and no TCI-state that is used for transmission of the PDSCH is activated in the first cell, determining the spatial relation for uplink transmission of the first cell by using the first resource in the second cell; and
perform uplink transmission in the first cell based on the spatial relation for uplink transmission of the first cell.

10. The electronic device according to claim 9, wherein the second cell comprises one of the following:
a primary cell corresponding to the first cell;
a scheduling cell of the first cell; or
a cell in cells that meet a first condition.

11. The electronic device according to claim 9, wherein the second cell comprises one of the following:
a primary cell corresponding to the first cell, wherein a frequency of the primary cell corresponding to the first cell belongs to a frequency range 2;
a scheduling cell of the first cell, wherein a frequency of the scheduling cell of the first cell belongs to the frequency range 2; or
a cell in cells that meet a first condition, wherein at least one of the frequency of the primary cell corresponding to the first cell or the frequency of the scheduling cell of the first cell belongs to the frequency range 1.

12. The electronic device according to claim 10, wherein the cells that meet the first condition comprise one of the following:
a cell in a cell group to which the first cell belongs;
in the cell group to which the first cell belongs, a cell that is configured with a control-resource set;
in the cell group to which the first cell belongs, a cell that uses a frequency range 2;
in the cell group to which the first cell belongs, a cell that is configured with the control-resource set and uses the frequency range 2;
a cell in a frequency band to which the first cell belongs;
in the frequency band to which the first cell belongs, a cell that is configured with a control-resource set;
in the frequency band to which the first cell belongs, a cell that uses the frequency range 2;
in the frequency band to which the first cell belongs, a cell that is configured with the control-resource set and uses the frequency range 2;
a cell in a frequency band list to which the first cell belongs;
in the frequency band list to which the first cell belongs, a cell that is configured with a control-resource set;
in the frequency band list to which the first cell belongs, a cell that uses the frequency range 2; or
in the frequency band list to which the first cell belongs, a cell that is configured with the control-resource set and uses the frequency range 2.

13. The electronic device according to claim 10, wherein the second cell comprises one of the following:
in the cells that meet the first condition, a cell with a minimum or maximum index; or
in the cells that meet the first condition, a cell whose frequency is the closest to a frequency of the first cell, wherein:
if in the cells that meet the first condition, there are a plurality of cells whose frequencies are the closest to the frequency of the first cell, the second cell comprises the cell with the minimum or maximum index in the cells that meet the first condition and whose frequencies are the closest to the frequency of the first cell.

14. The electronic device according to claim 9, wherein the first resource in the second cell comprises one of the following:
- in a bandwidth part currently activated in the second cell, a reference signal resource that is used to indicate quasi-co-location information of a physical downlink control channel and that is in a control-resource set with a minimum index in one or more control-resource sets that are obtained through monitoring last time;
- in the bandwidth part currently activated in the second cell, a reference signal resource in a transmission configuration indication state (TCI-state) with a minimum index in TCI-states that are used for transmission of a physical downlink shared channel (PDSCH);
- when an initial access process is performed in the second cell, a resource in a used synchronization signal and broadcast channel measurement resource block (SSB);
- a resource in a spatial relation for uplink transmission of the second cell; or
- a reference signal resource for road loss measurement of the second cell.

15. The electronic device according to claim 9, wherein the uplink transmission comprises one of the following:
- uplink transmission of a physical uplink control channel (PUCCH);
- uplink transmission of a physical uplink shared channel (PUSCH); or
- uplink transmission of a sounding reference signal (SRS).

16. The electronic device according to claim 9, wherein a spatial domain reception filter of the first resource comprises a spatial domain transmission filter for the uplink transmission.

17. A non-transitory computer-readable storage medium, the non-transitory computer-readable storage medium storing programming instructions for execution by at least one processor to:
- determine a spatial relation for uplink transmission of a first cell by using a first resource in a second cell, wherein the second cell is selected based on that a frequency of the second cell meets a predetermined condition, wherein determining the spatial relation for uplink transmission of the first cell by using the first resource in the second cell comprises one of the following:
  - when the spatial relation for uplink transmission is not configured in the first cell, determining the spatial relation for uplink transmission of the first cell by using the first resource in the second cell;
  - when the spatial relation for uplink transmission is not configured in the first cell, no CORESET is configured in the first cell, and no TCI-state that is used for transmission of a PDSCH is activated in a downlink bandwidth part currently activated in the first cell, determining the spatial relation for uplink transmission of the first cell by using the first resource in the second cell; or
  - when the spatial relation for uplink transmission and a reference signal resource for road loss measurement are not configured in the first cell, no control-resource set is configured in the first cell, and no TCI-state that is used for transmission of the PDSCH is activated in the first cell, determining the spatial relation for uplink transmission of the first cell by using the first resource in the second cell; and
- perform uplink transmission in the first cell based on the spatial relation for uplink transmission of the first cell.

18. The non-transitory computer-readable storage medium according to claim 17, wherein the second cell comprises one of the following:
- a primary cell corresponding to the first cell;
- a scheduling cell of the first cell; or
- a cell in cells that meet a first condition.

19. The non-transitory computer-readable storage medium according to claim 18, wherein the second cell comprises one of the following:
- a primary cell corresponding to the first cell, wherein a frequency of the primary cell corresponding to the first cell belongs to a frequency range 2;
- a scheduling cell of the first cell, wherein a frequency of the scheduling cell of the first cell belongs to the frequency range 2; or
- a cell in cells that meet a first condition, wherein at least one of the frequency of the primary cell corresponding to the first cell or the frequency of the scheduling cell of the first cell belongs to the frequency range 1.

* * * * *